US010602067B2

(12) United States Patent
Tsubaki

(10) Patent No.: US 10,602,067 B2
(45) Date of Patent: Mar. 24, 2020

(54) IMAGE PROCESSING APPARATUS, IMAGE PROCESSING METHOD, IMAGE PICKUP APPARATUS AND STORAGE MEDIUM THAT CALCULATES A CORRECTION QUALITY TO CORRECT A SHAKE OF VIEWPOINT IMAGES AND A MIXTURE RATIO FOR GENERATION OF A VIRTUAL VIEWPOINT WHEN GENERATING THE VIRTUAL VIEWPOINT IMAGE USING AN AMOUNT OF CHANGE IN POSITION OF AN IMAGING UNIT

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/058,120

(22) Filed: Aug. 8, 2018

(65) Prior Publication Data

US 2019/0052810 A1 Feb. 14, 2019

(30) Foreign Application Priority Data

Aug. 10, 2017 (JP) ................................ 2017-155705

(51) Int. Cl.
*H04N 5/228* (2006.01)
*H04N 5/232* (2006.01)

(52) U.S. Cl.
CPC ..... *H04N 5/23267* (2013.01); *H04N 5/23229* (2013.01); *H04N 5/23258* (2013.01); *H04N 5/23287* (2013.01)

(58) Field of Classification Search
CPC .................................................. H04N 5/23258
See application file for complete search history.

(56) References Cited

U.S. PATENT DOCUMENTS 8,520,059 B2    8/2013  Aoki
9,432,656 B2 *  8/2016  Tajiri .................. H04N 5/2254

FOREIGN PATENT DOCUMENTS

JP    2012-191351 A    10/2012
JP       5192096 B2     5/2013
JP    2016-042662 A     3/2016

OTHER PUBLICATIONS

Madwick, S.; "Gait tracking with x-IMU"; Sep. 3, 2013; https://x-io.co.uk/gait-tracking-with-x-imu/; 2 pages (Year: 2013).*

(Continued)

*Primary Examiner* — Gary C Vieaux
(74) *Attorney, Agent, or Firm* — Cowan, Liebowitz & Latman, P.C.

(57) ABSTRACT

In an image pickup apparatus, a parallax image acquisition unit acquires data of a plurality of viewpoint images having different viewpoints from an imaging unit. A detection unit detects the amount of change in a position or an attitude of the imaging unit which has generated the data of the plurality of viewpoint images. A calculation unit calculates a correction quantity of a shake correction unit and a mixture ratio of images when an image compositing unit generates a composite image from the plurality of viewpoint images on the basis of the amount of change in a position or an attitude of the image pickup apparatus. The image compositing unit generates a composite image from the plurality of viewpoint images using the calculated mixture ratio. The shake correction unit corrects image shake of the viewpoint images or the composite image according to the calculated correction quantity.

20 Claims, 13 Drawing Sheets

(56) References Cited

OTHER PUBLICATIONS

Seitz et al., "View Morphing" pp. 21-30, Siggraph 1996, Conference Proceedings, Annual Conference Series.
D.Titterton, "Strapdown Inertial Navigation Technology" Peter Peregrinus Ltd., 594 pgs.
Ng et.al. "Light Field Photography with a Hand-Held Plenoptic Camera" Stanford Tech Report CTSR Feb. 2005 11 pgs.
B. Wilburn et.al., "High Performance Imaging Using Large Camera Arrays" pp. 765-776, SIGGRAPH 2005.
S. Madgwick, "An efficient orientation filter for inertial and inertial/magnetic sensor arrays" 32 pgs, Technical report, Department of Mechanical Engineering, University of Bristol, Apr. 2010.
N. Engelhard et al., "Real-time 3D visual SLAM with a hand-held RGB-D camera" 2 pgs, European Robotics Forum (2011).

* cited by examiner

MOTION OF PARALLAX DIFFERENCE IS ALSO CORRECTED

IMAGE PROCESSING APPARATUS, IMAGE PROCESSING METHOD, IMAGE PICKUP APPARATUS AND STORAGE MEDIUM THAT CALCULATES A CORRECTION QUALITY TO CORRECT A SHAKE OF VIEWPOINT IMAGES AND A MIXTURE RATIO FOR GENERATION OF A VIRTUAL VIEWPOINT WHEN GENERATING THE VIRTUAL VIEWPOINT IMAGE USING AN AMOUNT OF CHANGE IN POSITION OF AN IMAGING UNIT

BACKGROUND OF THE INVENTION

Field of the Invention

The present invention relates to an image processing apparatus, an image processing method, an image pickup apparatus, and a storage medium which are capable of reducing the influence of hand shake of a user, shake of a subject and the like on an image or a video when an image or a video is captured.

Description of the Related Art

There are electronic shake correction of performing geometrical deformation of images, and optical shake correction in image pickup apparatuses. The latter includes in-lens shake correction which drives some lenses in an imaging optical system and imager shake correction which moves an imaging element. None of these shake correction methods is able to cancel out variation in parallax differences due to shifting of the viewpoint in image shake caused by movement of the position of an image pickup apparatus. Meanwhile, image pickup apparatuses having a light field photography function, a pupil division photography function and the like and capable of capturing a plurality of viewpoint images can perform a ranging operation. A trajectory of an image pickup apparatus including positional deflection in addition to rotational deflection of the image pickup apparatus can be correctly measured using a distance acquired through a ranging operation (N. Engelhard et al., "Real-time 3D visual SLAM with a hand-held RGB-D camera." European Robotics Forum, 2011). Japanese Patent Laid-Open No. 2012-191351 discloses a technique of generating a virtual viewpoint image by controlling a mixture ratio between parallax images. Japanese Patent Laid-Open No. 2016-42662 discloses a technique of canceling out variation in parallax differences due to shifting of the viewpoint to perform shake correction.

However, imaging unit capable of performing shake correction and correction for shake of subjects are limited, and image shake called shake cannot be corrected using only the method of controlling a mixture ratio between parallax images and performing shake correction according to shifting of the viewpoint of an image. Furthermore, when a method of simply combining image compositing according to mixture ratio control and conventional shake correction is used, excess correction may occur and thus unnecessary image shake may be added.

SUMMARY OF THE INVENTION

The present invention is to acquire an image in which vibration due to hand shake and the like and a motion of an image secondarily added during image compositing have been corrected in image shake correction in response to a positional variation of an imaging unit, and the like.

According to an embodiment of the present invention, an image pickup apparatus is provided that includes at least one processor and at least one memory functioning as: a first acquisition unit configured to acquire data of a plurality of viewpoint images having different viewpoints; a second acquisition unit configured to acquire the amount of change in a position of an imaging unit which has generated the data of the plurality of viewpoint images; a generation unit configured to generate data of an image having a viewpoint different from the plurality of viewpoint images using the data of the plurality of viewpoint images; a shake correction unit configured to correct shake of the viewpoint images or the image generated by the generation unit; and a calculation unit configured to calculate a correction quantity of the shake correction unit and a mixture ratio used when the generation unit generates the image using the amount of change acquired by the second acquisition unit.

According to the image processing apparatus of the present invention, it is possible to obtain an image in which vibration due to hand shake and the like and a motion of an image secondarily added during image compositing have been corrected in image shake correction in response to positional variation of an imaging unit, and the like.

Further features of the present invention will become apparent from the following description of exemplary embodiments (with reference to the attached drawings).

DESCRIPTION OF THE EMBODIMENTS

Hereinafter, each of embodiments of the present invention will be described in detail with reference to the drawings. In the present description, an image acquired at a specific viewpoint is called a viewpoint image and a plurality of viewpoint images having different viewpoints are called parallax images.

[First Embodiment]

Figure 1:
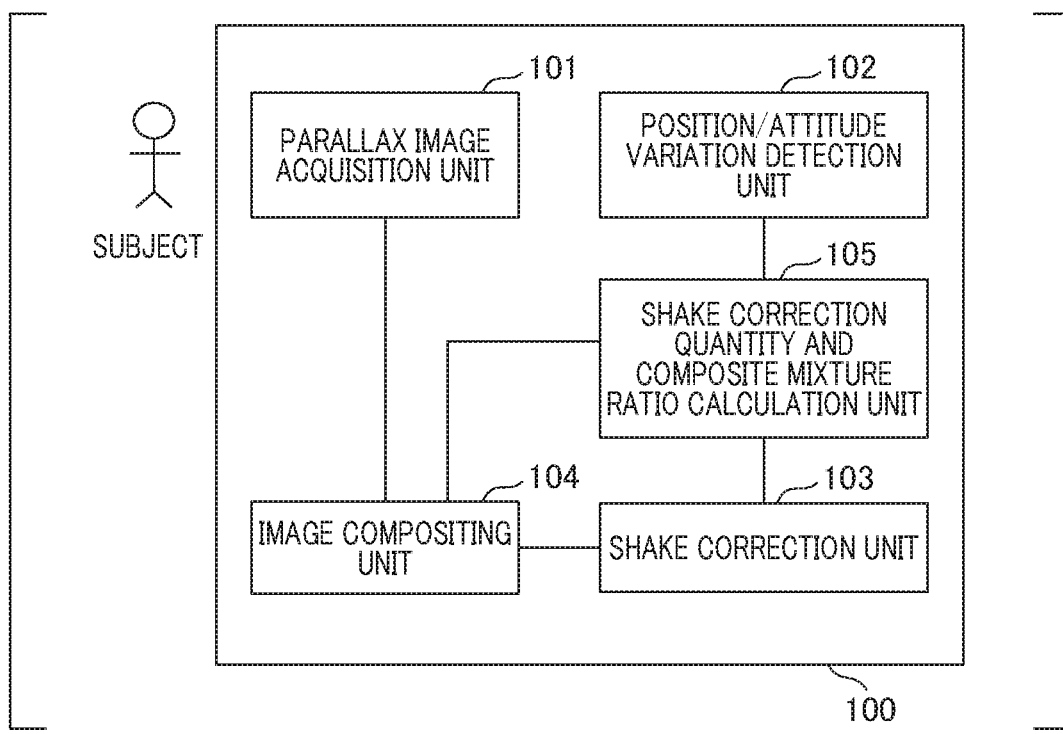
FIG. 1 is a schematic diagram illustrating an image pickup apparatus according to a first embodiment.

FIG. 1 is a block diagram showing main components of an image pickup apparatus 100 of the present embodiment. A parallax image acquisition unit 101 acquires parallax images by capturing images of a subject at different positions or in different directions. As a configuration for acquiring parallax images, a configuration in which a plurality of image pickup apparatuses are arranged in an array form (B. Wilburn, et al., "High Performance Imaging Using Large Camera Arrays," pp. 765-776, SIGGRAPH 2005) may be provided. Alternatively, there is a configuration including an imaging system realized by combining a main lens and micro-lenses arranged on an imaging element, and the imaging element, which is called a light field photography system (Ren. Ng. et al., "Light Field Photography with a Hand-Held Plenoptic Camera," Stanford Tech Report CTSR 2005-02) or a pupil division photography system (Japanese Patent Publication No. 5192096). Parallax images may be acquired by a plurality of photoelectric conversion parts corresponding to each micro-lens. Data of the acquired parallax images is output to an image compositing unit 104.

A position/attitude variation detection unit 102 acquires information on variations in the position and attitude of the image pickup apparatus. There are methods of detecting variations in positions and attitudes using a combination of inertial sensors such as a gyro sensor and an acceleration sensor, and methods of detecting variations in positions and attitudes using an inertia measurement unit (IMU) assembly. Further, detection of variations in positions and attitudes is not limited to methods using inertial sensors and may be realized through detection methods according to a combination of an attitude and heading reference system (AHRS) and a global positioning system (GPS) service. Moreover, it is possible to increase the accuracy of acquisition of variations in positions and attitudes using a method of combination with other sensors such as a geomagnetic sensor or using image information. The detection unit 102 may be configured using Visual Simultaneous Localization and Mapping (SLAM) which sequentially reconstructs three-dimensional shapes from a moving image to estimate a position and an attitude of a camera. When a movement range of a moving body having a camera mounted therein is limited to indoor spaces, positional variations of the moving body may be detected using a ranging mechanism according to a beacon.

A calculation unit 105 acquires information output from the detection unit 102 and calculates a shake correction quantity and a composite mixture ratio. In calculation of a shake correction quantity, the calculation unit 105 calculates data of camera work of a shake component different from camera work intended by a user using, as an input, data representing variation in the position or attitude of the image pickup apparatus, acquired by the detection unit 102. In addition, the calculation unit 105 calculates a shake correction quantity within a correctable range of a shake correction unit 103. Further, the calculation unit 105 calculates a composite mixture ratio between a plurality of viewpoint images used by the image compositing unit 104 in calculation of the composite mixture ratio. The composite mixture ratio may be calculated according to the size and direction of a component of the shake correction quantity, which is perpendicular to the optical axis, with respect to the position of the shake correction quantity.

For example, the shake correction unit 103 performs electronic shake correction based on image processing. The shake correction unit 103 applies a geometrical correction process such as projection transformation to an input image from the image compositing unit 104 according to the shake correction quantity calculated by the calculation unit 105 to suppress image shake. Further, the shake correction unit 103 notifies the calculation unit 105 of the correctable range.

The image compositing unit 104 performs an image compositing process according to the composite mixture ratio obtained by the calculation unit 105 using the acquired parallax images. A composite image generated according to compositing by varying a composite mixture ratio between a plurality of viewpoint images is also called a virtual viewpoint image. That is, the virtual viewpoint image is a viewpoint image assumed to be captured at a different viewpoint from a viewpoint image before compositing.

Figure 2A:
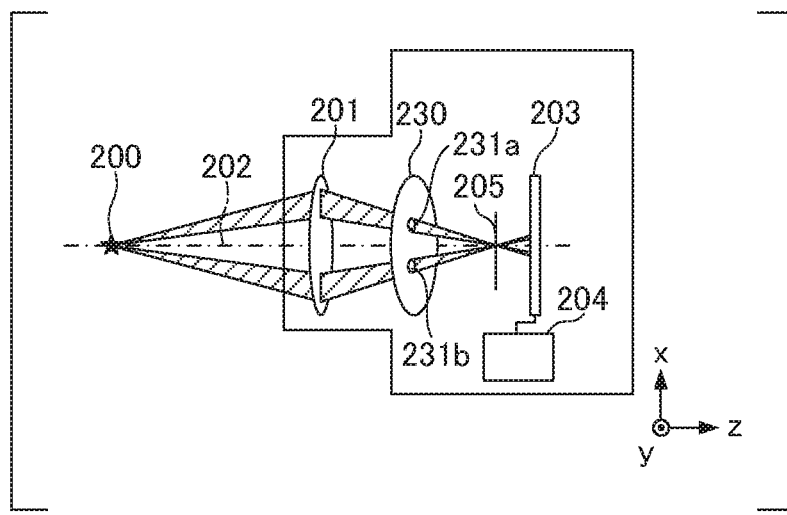
FIGS. 2A to 2E are diagrams illustrating a parallax image acquisition unit in a pupil division photography system and a light field photography system.
Figure 2B:
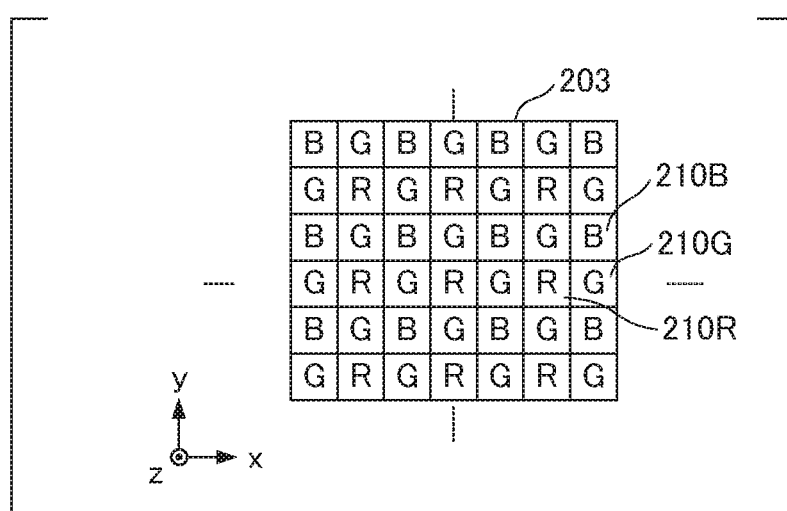
Figure 2C:
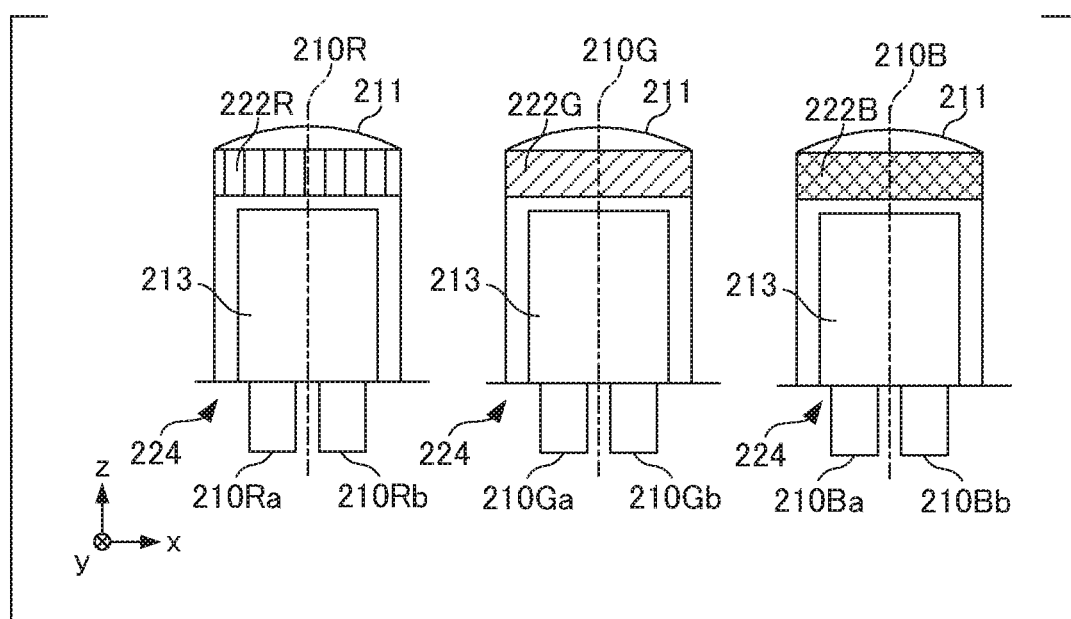

The parallax image acquisition unit 101 will be described with reference to FIGS. 2A to 2E. FIG. 2A is a diagram schematically illustrating a subject 200, an imaging optical system (imaging optical system) 201, an imaging element 203 and an operation processing unit 204. A y axis is defined in a direction perpendicular to the page surface of FIG. 2A with respect to a z axis parallel with an optical axis 202 of the imaging optical system 202. An axis perpendicular to the z axis and the y axis is defined as an x axis. FIG. 2B is a schematic diagram showing part of a pixel arrangement when the imaging element 203 is viewed in the optical axis direction (z-axis direction). The direction perpendicular to the page surface of FIG. 2B is the z-axis direction and the x-axis direction and the y-axis direction are perpendicular to each other in the page. A plurality of pixels 210R, 210G and 210B are arranged in parallel on the xy plane. R, G and B respectively correspond to red, green and blue which are colors of color filters of respective pixels. FIG. 2C is cross-sectional view schematically illustrating structures of the pixels 210R, 210G and 210B. A direction perpendicular to the page surface of FIG. 2C is defined as the y-axis direction. With respect to the x axis and the z axis perpendicular to each other in the page, the x-axis direction is defined as a crosswise direction and the z-axis direction is defined as a vertical direction.

Figure 2D:
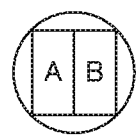
Figure 2E:
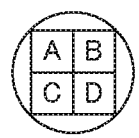

The imaging element 203 constituting a pupil division photography system or a light field photography system includes a plurality of separate photoelectric conversion parts. FIG. 2D illustrates photoelectric conversion parts divided into two in the x-axis direction. These photoelectric conversion parts constitute two pixels (which are also called sub-pixels) A and B. In addition, FIG. 2E illustrates photoelectric conversion parts divided into two in the x-axis direction and two in the y-axis direction. These photoelectric conversion parts constitute four sub-pixels A, B, C and D.

First, a case of two viewpoints in which the number of pupil divisions is 2 in a predetermined direction, as shown in FIG. 2D, will be described. As shown in FIG. 2C, each pixel part is composed of a micro-lens 211, a color filter 222R, 222G or 222B, photoelectric conversion parts 210Ra, 210Rb, 210Ga, 210Gb, 210Ba or 210Bb, and a waveguide 213. The imaging element 203 includes color filters 2221R 222G and 222B in different colors for respective pixels and has spectral characteristics according to a detected wavelength band. Pixel parts which respectively acquire red light, green light and blue light according to the color filters 222R, 222G and 222B are formed. A color arrangement pattern of the color filters is known and thus description thereof is omitted. A material having absorptiveness for light in a wavelength band detected through each pixel part, for example, Si, is used for a substrate 224, which has photoelectric conversion parts formed through ion implantation or the like in at least part of regions inside thereof. Each pixel part includes wiring which is not shown.

Photoelectric conversion parts 210Xa and 210Xb are distinguished from each other by introducing an index variable X which identifies a color of a color filter and setting X=R, G and B. For example, when X=R, photoelectric conversion parts corresponding to the red color filter are photoelectric conversion parts 210Ra and 210Rb. "a" corresponds to the sub-pixel A in FIG. 2D and "b" corresponds to the sub-pixel B in FIG. 2D. A beam 232a and a beam 232b which have respectively passed through a first pupil region 231a and a second pupil region 231b which are different regions of an exit pupil 230 shown in FIG. 2A are considered. The beam 232a is input to the photoelectric conversion part 210Xa and the beam 232b is input to the photoelectric conversion part 210Xb. A first signal and a second signal are acquired according to the photoelectric conversion parts 210Xa and 210Xb, respectively. A plurality of first signals are combined to generate an image A and a plurality of second signals are combined to generate an image B. In the following, a pixel part having a photoelectric conversion part for acquiring the first signals to form the image A is called a pixel A and a pixel part having a photoelectric conversion part for acquiring the second signals to form the image B is called a pixel B. Signals acquired by each photoelectric conversion part are transmitted to the operation processing unit 204 of FIG. 2A and a process for generating the image A and the image B (parallax images) is performed.

FIG. 2D schematically illustrates the pixel A and the pixel B when the pixel structure with respect to each micro-lens is viewed in the incident direction of the optical axis. That is, the pixel A corresponds to any one of the photoelectric conversion parts 210Ra, 210Ga and 210Ba and the pixel B corresponds to any one of the photoelectric conversion parts 210Rb, 210Gb and 210Bb. This is an example of two viewpoints separated in the horizontal direction or the vertical direction.

FIG. 2E schematically illustrates a configuration in which pupil division is performed in the horizontal direction and the vertical direction, that is, four separate pixels (pixels A, B, C and D). A degree of freedom of available viewpoint positions is higher in the case of four viewpoints than in the case of two viewpoints in a process of generating a virtual viewpoint image according to composite mixture ratio control. In an imaging element for a pupil division photography system, pixels A to D under each micro-lens are formed through a semiconductor manufacturing process. In the light field photography system described in Ren. Ng, et al., "Light Field Photography with a Hand-Held Plenoptic Camera," Stanford Tech Report CTSR 2005-02, a process of pressure-fixing micro-lenses for realizing pupil division onto a chip through a process after a post process is performed. Accordingly, a degree of freedom regarding the diameter, curvature and the like of the micro-lens increases and a larger number of pixels can be disposed under a single micro-lens. Therefore, a configuration for capturing a plurality of parallax images through one shot is possible.

Figure 3A:
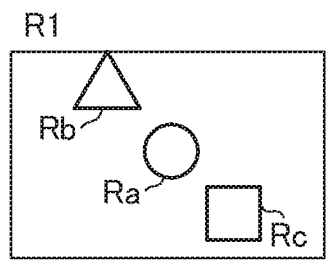
FIGS. 3A to 3E are schematic diagrams illustrating examples of a plurality of viewpoint images.
Figure 3B:
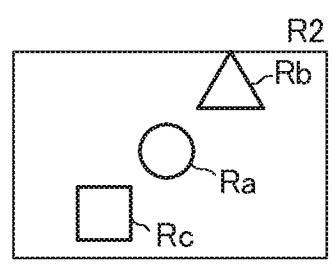
Figure 3C:
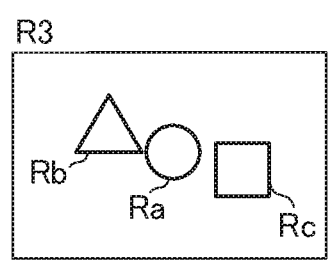
Figure 3D:
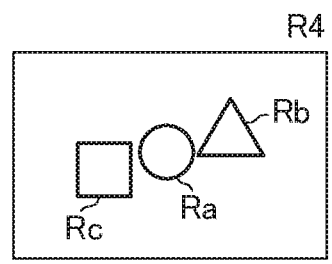
Figure 3E:
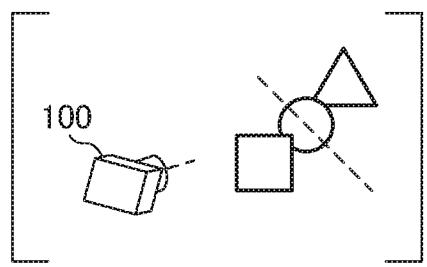

FIGS. 3A to 3E show examples of parallax images acquired by an image pickup apparatus including a four-viewpoint pupil division optical system. FIGS. 3A to 3D are schematic diagrams respectively illustrating different viewpoint images R1 to R4. FIG. 3E is an overhead view of an arrangement when images are captured and shows a positional relationship between the image pickup apparatus 100 and each subject. In a positional relationship between three subjects on the basis of the position of the image pickup apparatus 100, the depth direction is a direction away from the image pickup apparatus 100, and three subjects "□", "○" and "Δ" disposed at different positions are illustrated. An image of the subject "□" closest to the image pickup apparatus 100 is Rc, an image of the second close subject "○" is Ra, and an image of the farthest subject "Δ" is Rb. In FIGS. 3A to 3E, position shifting between viewpoint images (position shifting of the images Rb and Rc) are exaggerated.

The viewpoint images R1 to R4 respectively shown in FIGS. 3A to 3D are images captured such that an imaging lens focuses on the subject "○" among the three subjects. The image Rb of the subject "Δ" positioned behind the subject "○" and the image Rc of the subject "□" positioned before the subject "○" become defocused images. Since the viewpoint images R1 to R4 are images captured using a camera of a monocular pupil division system using a single imaging lens, the image Ra of the focused subject "○" does not shift even when viewpoints change. On the other hand, with respect to the images Rb and Rc of the subjects in a defocused state, images shifted to different positions for each of four viewpoints are obtained.

Figure 4:
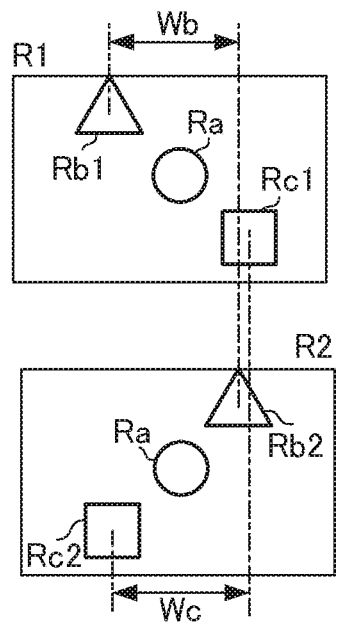
FIG. 4 is a diagram illustrating a parallax amount difference due to differences in positions in the depth direction.

Next, an example of two viewpoints will be described with reference to FIG. 4. For example, FIG. 4 is a diagram for describing position shifting of subjects between FIG. 3A and FIG. 3B, that is, a method of applying parallax. A positional relationship between the subjects "□", "○" and "Δ" is the same as FIG. 3E. With respect to the subject "○" having a subject distance based on the position of the image pickup apparatus 100, which corresponds to a focal distance, no parallax occurs between the viewpoint images R1 and R2. On the contrary, with respect to the subject "Δ" behind the subject "○" and the subject "□" before the subject "○", parallaxes in opposite directions occur between the viewpoint images.

A parallax quantity of the subject "Δ" positioned behind the subject "○" corresponds to a displacement quantity Wb between an image Rb1 in the viewpoint image R1 and an image Rb2 in the viewpoint image R2. In addition, a parallax quantity of the subject "□" positioned before the subject "○" corresponds to a displacement quantity Wc between an image Rc1 in the viewpoint image R1 and an image Rc2 in the viewpoint image R2. An observer is able to visually recognize that the image of the subject "Δ" recedes further and the image of the subject "□" protrudes further forward as the displacement quantities Wb and Wc increase, and thus the displacement directions are opposite to each other.

When the viewpoint images of FIGS. 3A and 3B respectively corresponding to the images of FIG. 4 are sequentially compared, image variation according to parallax looks like a seesaw motion having the image Ra of the subject "○", that is, the image of the subject having zero parallax variation, as a fulcrum point (center point) for an observer. Such motion is uniformly generated between the two viewpoint images in the vertical direction, for example, R1 and R3.

A process of the present embodiment will be described with reference to a flowchart of FIG. 5. In parallax image acquisition step S101, beams imaged on the imaging element through the main lens and the micro-lenses are received to acquire parallax images.

In step S102, information on variations in the position and attitude of the camera is acquired. The position/attitude variation detection unit 102 acquires inter-frame variation quantities ΔR and ΔT of an attitude R and a position T of the image pickup apparatus. In the present embodiment, a process of acquiring variations in the position and attitude of the image pickup apparatus using detection signals of position and attitude sensors is described. As position and attitude sensors, a first sensor such as a gyro sensor which detects attitude variations on a maximum of three axes in the image pickup apparatus and a second sensor such as an acceleration sensor which detects positional variations on a maximum of three axes in the image pickup apparatus are used. Alternatively, a geomagnetic sensor, an inclination sensor and the like may be used.

A sampling frequency of the first sensor for camera attitude estimation is represented by the following expression.

$$f_{s\_g} \qquad \text{[Expression 1]}$$

A voltage value or a current value obtained using a period corresponding to the sampling frequency or sensor output information obtained as a digital value is converted into an angle variation and output. For example, when the detection unit 102 includes a gyro sensor outputting digital values, an output value of a sensor attached for each coordinate axis direction, which is represented by Expression 2, is multiplied by a correction gain (represented by gainx) acquired through pre-calibration.

$$val_{x\_g} \qquad \text{[Expression 2]}$$

Accordingly, a correct angular velocity at a discrete time i is obtained according to Equation 1.

[Expression 3]

$$ral_{x\_g}(i) = gain_x \cdot val_{x\_g}(i) \quad (x=Y,P,R) \qquad \text{(Equation 1)}$$

In Equation 1, subscript x denotes the axial direction of a sensor disposed on each of axes perpendicular to each other on the basis of the optical axis of an imaging optical system. X=Y, P, R represents the yaw direction, pitch direction and roll direction of the image pickup apparatus 100. "_g" represents angular velocity information obtained on the basis of the sampling frequency of the gyro sensor.

An angular velocity is regarded as an attitude change of the camera represented by an angle variation in a very short period which is a sampling period of the gyro sensor represented by Expression 4. However, there is then an excessively large amount of information, and thus information having a lower sampling frequency is acquired through integration.

$$t_{s\_g} = 1/f_{s\_g} \qquad \text{[Expression 4]}$$

For example, the amount of information of data integrated according to a sampling frequency for representing an attitude variation between image frames, represented by Expression 5, is compressed and output.

$$f_{s\_fr} \qquad \text{[Expression 5]}$$

Specifically, the sampling frequency has a value of 60 Hz, 30 Hz or the like. Hereinafter, an arbitrary sampling frequency is represented by Expression 6.

$$f_{s\_y}(:f_{sfr}, \ldots) \qquad \text{[Expression 6]}$$

The data is converted into an attitude variation of a sampling period suitable for each process according to integration based on Equation 2 below and delivery of information is performed.

[Expression 7]

$$\Delta R_x \cong rat_{x\_y}(j) = \int_0^{n_{y\_g}-1} gain_x \cdot val(n_{y\_g}\,j + t)dt = \qquad \text{(Equation 2)}$$

$$\sum_{i=0}^{n_{y\_g}-1} (gain_x \cdot val(n_{y\_g}\,j + i) \cdot t_{s\_y})$$

Here, $dt = t_{s\_y}$.

In Equation 2, Expression 8 represents a scaling factor of a sampling period after integration with respect to the sampling period of the gyro sensor.

$$n_{y\_g} \qquad \text{[Expression 8]}$$

Expression 9 represents an attitude variation at a time j for a sampling object y with respect to the axis x (yaw, pitch and roll).

$$rat_{x\_y}(j) \qquad \text{[Expression 9]}$$

Expression 10 represents a sampling interval per object.

$$t_{s\_y} \qquad \text{[Expression 10]}$$

Here, Expression 11 is set for simplification in the following.

$$\Delta R_x(x:Y,P,R) \qquad \text{[Expression 11]}$$

Equation 2 may be regarded as an operation element which outputs an attitude variation in a unit time. Accordingly, accuracy of output values may be improved by additionally performing a process of removing offset drift which is a problem specific to an angular velocity sensor and the like which are constituent elements.

With respect to acceleration information obtained from an acceleration sensor attached for each direction of the yaw axis, pitch axis and roll axis of the image pickup apparatus 100, speed variations and positional variations in the image pickup apparatus may be calculated by integrating values from which the influence of gravity has been eliminated. As described above, a positional variation in the sampling interval may be represented by Expression 12.

$$\Delta t_x(x:Y,P,R) \qquad \text{[Expression 12]}$$

A technique of calculating a position attitude or a position attitude variation, particularly, an attitude, of an object equipped with an inertial sensor set using inertial sensors composed of a gyro sensor and an acceleration sensor is a general technique called a strapdown type AHARS. For additional signal processing for attitude signals, the conventional technologies described in D. Titterton, "Strapdown Inertial Navigation Technology," Peter Peregrinus Ltd, S. Madgwick. "An efficient orientation filter for inertial and inertial/magnetic sensor arrays", Technical report, Department of Mechanical Engineering, University of Bristol, April 2010, are used. For example, there is a configuration in which an attitude variation information comparison process is performed using output information of an acceleration sensor and a drift which is a cause of accuracy deterioration is eliminated to output attitude variation information with higher accuracy. For the same reason, an attitude sensor may be an integrated multiaxial sensor of an assembly capable of measuring attitude variations of multiple axes at a time. To identify the direction of gravity, perpendicularity information obtained from terrestrial magnetism is used or, when an assumption that the yaw axis corresponds to the perpendicular direction, for example, in the initial attitude of the image pickup apparatus, and the like has been established, the corresponding information is used (http://wwvw.x-io.co.uk/gait-tracking-with-x-imu/, "Gait tracking with x-IMU").

With respect to an attitude variation, a value is obtained in the form of a matrix, a quaternion or a vector value for each coordinate axial component arbitrarily set in the image pickup apparatus or a space through the aforementioned processes. In the same manner, a positional variation may be obtained as a vector value for each coordinate axial component arbitrarily set in the image pickup apparatus or a space. In addition, data is acquired in the form of variations ΔR and ΔT of attitude R and position T, which have been integrated using timing between image frames, for example, in consideration of easy handling of image processing.

Figure 5:
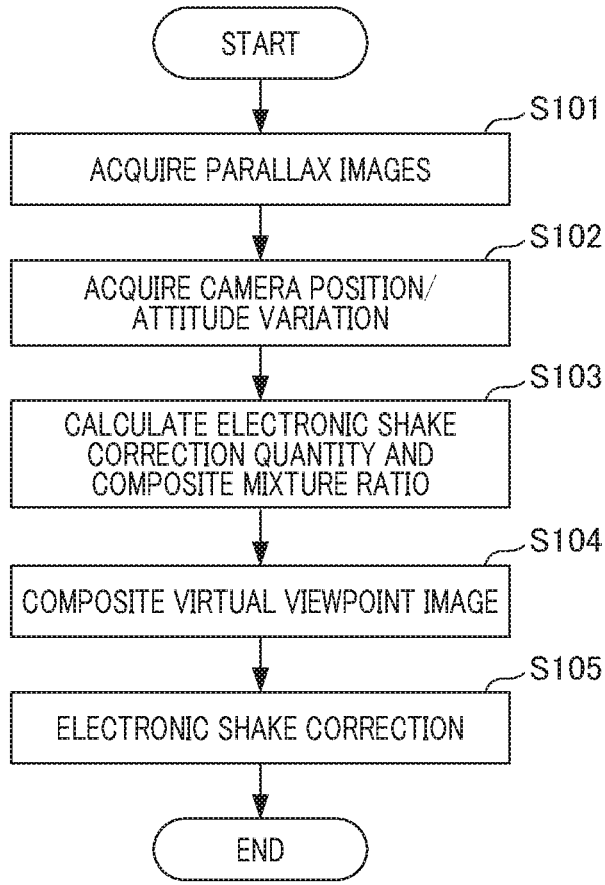
FIG. 5 is a flowchart illustrating a shake correction process according to the first embodiment.

In S103 of FIG. 5, calculation of an electronic shake correction quantity and a composite mixture ratio is performed. A process of obtaining a trajectory of the image pickup apparatus 100 is performed by integrating the variations ΔR and ΔT of the attitude R and position T of the image pickup apparatus 100, which have been acquired in S102. A filtering process is performed on the obtained trajectory of the image pickup apparatus 100, and the amount of change in the attitude and position of the image pickup apparatus 100 for separating and canceling out unintended camera work is calculated as a camera position and attitude correction quantity. In the present embodiment, a process of separating camera work intended by the user from unintended camera work using a Kalman filter is described. It is possible to efficiently perform sequential state model update and filtering using a Kalman filter.

To use a Kalman filter, a state space model representing a time series is employed as expressed by the equations below.

[Expression 13]

$$x_{n+1} = F_n x_n + G_n v_n \quad \text{System model (Equation 3)}$$

$$y_n = H_n x_n + w_n \quad \text{Observation mode (Equation 4)}$$

Here, xn is a k-dimensional vector which cannot be directly observed and is called a state.

$$v_n \quad \text{[Expression 14]}$$

Expression 14 represents system noise having an average vector corresponding to a zero vector, which is m-dimensional normal white noise conforming to a variance-covariance matrix below.

$$Q_n \quad \text{[Expression 15]}$$

$$w_n \quad \text{[Expression 16]}$$

Expression 16 represents observation noise having an average vector corresponding to a zero vector, which is one-dimensional normal white noise conforming to a variance-covariance matrix below.

$$R_n \quad \text{[Expression 17]}$$

$$F_n, G_n, H_n \quad \text{[Expression 18]}$$

Expression 18 represents k×k, k×m and l×k matrices.

A system model which is a constant-speed model is defined by a state variable represented by Expression 19 and a speed variable represented by Expression 20.

$$x(x:t_x, t_y, t_z, q_w, q_x, q_y, q_z) \quad \text{[Expression 19]}$$

$$\Delta x \quad \text{[Expression 20]}$$

For example, the state variable x is defined as a state variable at frame timing below.

$$x_n \quad \text{[Expression 21]}$$

A state variable in an n-th frame is calculated from cumulative variations ΔR and ΔT of the attitude R and position T of the image pickup apparatus as represented by the following equation.

[Expression 22]

$$M_n = \begin{bmatrix} R_n & T_n \\ 0 & 1 \end{bmatrix} = \begin{bmatrix} \Delta R & \Delta T \\ 0 & 1 \end{bmatrix} \begin{bmatrix} R_{n-1} & T_{n-1} \\ 0 & 1 \end{bmatrix} \quad \text{(Equation 5)}$$

A matrix Mn of the n-th frame is calculated from a matrix Mn−1 of an (n−1)-th frame using the variations ΔR and ΔT.

Here, rotation components of a rotation matrix are substituted with quaternions.

[Expression 23]

$$R = \begin{bmatrix} a & b & c \\ d & e & f \\ g & h & i \end{bmatrix} = \begin{bmatrix} \cos(r) & -\sin(r) & 0 \\ \sin(r) & \cos(r) & 0 \\ 0 & 0 & 1 \end{bmatrix} \begin{bmatrix} \cos(y) & 0 & \sin(y) \\ 0 & 1 & 0 \\ -\sin(y) & 0 & \cos(y) \end{bmatrix} \begin{bmatrix} 1 & 0 & 0 \\ 0 & \cos(p) & -\sin(p) \\ 0 & \sin(p) & \cos(p) \end{bmatrix} \quad \text{(Equation 6)}$$

$$\vec{q} = quat(R), \vec{q} = \lfloor q_w, q_x, q_y, q_z \rfloor \quad \text{(Equation 7)}$$

In Equation 6, variables represented in Expression 24 represent correction quantities (angles) of rotation in the roll, pitch and yaw directions of the camera with respect to the optical axis, respectively.

$$r, p, y \quad \text{[Expression 24]}$$

In addition, in Equation 7, quat( ) represented in Expression 25 is a rotation matrix-to-quaternion transformation function.

$$quat( ) \quad \text{[Expression 25]}$$

The speed variable is an internal parameter which is not shown in the table. A speed variation factor is handled as white Gaussian noise represented by Expression 26 to represent white Gaussian noise having a mean value of 0 and a variance σ.

$$N(0, \sigma) \quad \text{[Expression 26]}$$

First, a system model for a certain component is represented by the following equation.

[Expression 27]

$$\begin{bmatrix} x \\ \Delta x \end{bmatrix}^{n+1} = \begin{bmatrix} 1 & 1 \\ 0 & 1 \end{bmatrix} \begin{bmatrix} x \\ \Delta x \end{bmatrix}^n + \begin{bmatrix} 0 \\ N(0, \sigma) \end{bmatrix} \quad \text{(Equation 8)}$$

Accordingly, a state space system model for all input image variation components is given as the following equation 9. Meanwhile, elements in blank parts of the matrix and column vectors in Equation 9 are 0.

[Expression 28]

$$\begin{bmatrix} t_x \\ t_y \\ t_z \\ q_w \\ q_x \\ q_y \\ q_z \\ \Delta t_x \\ \Delta t_y \\ \Delta t_z \\ \Delta q_w \\ \Delta q_x \\ \Delta q_y \\ \Delta q_z \end{bmatrix}^{t+1} = \begin{bmatrix} 1 & & & & & & & 1 & & & & & & \\ & 1 & & & & & & & 1 & & & & & \\ & & 1 & & & & & & & 1 & & & & \\ & & & 1 & & & & & & & 1 & & & \\ & & & & 1 & & & & & & & 1 & & \\ & & & & & 1 & & & & & & & 1 & \\ & & & & & & 1 & & & & & & & 1 \\ & & & & & & & 1 & & & & & & \\ & & & & & & & & 1 & & & & & \\ & & & & & & & & & 1 & & & & \\ & & & & & & & & & & 1 & & & \\ & & & & & & & & & & & 1 & & \\ & & & & & & & & & & & & 1 & \\ & & & & & & & & & & & & & 1 \end{bmatrix}$$ (Equation 9)

$$\begin{bmatrix} t_x \\ t_y \\ t_z \\ q_w \\ q_x \\ q_y \\ q_z \\ \Delta t_x \\ \Delta t_y \\ \Delta t_z \\ \Delta q_w \\ \Delta q_x \\ \Delta q_y \\ \Delta q_z \end{bmatrix}^t + \begin{pmatrix} \\ \\ \\ \\ \\ \\ \\ N(0, \sigma_{t_x}) \\ N(0, \sigma_{t_y}) \\ N(0, \sigma_{t_z}) \\ N(0, \sigma_{q_w}) \\ N(0, \sigma_{q_x}) \\ N(0, \sigma_{q_y}) \\ N(0, \sigma_{q_z}) \end{pmatrix}$$

In addition, an observation model for each parameter is represented by the following equation 10.

[Expression 29]

$$\begin{bmatrix} \tilde{t}_x \\ \tilde{t}_y \\ \tilde{t}_z \\ \tilde{q}_w \\ \tilde{q}_x \\ \tilde{q}_y \\ \tilde{q}_z \end{bmatrix} = \begin{pmatrix} t_x \\ t_y \\ t_z \\ q_w \\ q_x \\ q_y \\ q_z \end{pmatrix} + \begin{pmatrix} N(0, \sigma_{t_x}^{obs}) \\ N(0, \sigma_{t_y}^{obs}) \\ N(0, \sigma_{t_z}^{obs}) \\ N(0, \sigma_{q_w}^{obs}) \\ N(0, \sigma_{q_x}^{obs}) \\ N(0, \sigma_{q_y}^{obs}) \\ N(0, \sigma_{q_z}^{obs}) \end{pmatrix}$$ (Equation 10)

The symbol "~" above t and q denotes an observation value.

$N(0, \sigma_x^{obs})$ [Expression 30]

Expression 30 represents white Gaussian observation noise with respect to an x component. A white Gaussian observation noise component represents an unintended motion. In addition, it is possible to control smoothness of camera motion by adjusting a variance of the observation noise and a variance of the system noise.

The aforementioned system model and observation model are represented by state space model matrices as expressed by the following equation 11.

[Expression 31]

$$F = \begin{bmatrix} I_{7\times7} & I_{7\times7} \\ 0_{7/7} & I_{7\times7} \end{bmatrix}, \quad G = \begin{bmatrix} 0_{7\times7} \\ I_{7\times7} \end{bmatrix},$$ (Equation 11)

$$H = [\, I_{7\times7} \quad 0_{7\times7} \,]$$

Furthermore, Expression 32 can be provided.

[Expression 32]

$Q = \sigma^{sys} I_{7\times7} \quad R = \sigma^{obs} I_{7\times7}$ (Equation 12)

Accordingly, sequential model updating, represented by Expression 33, is performed according to Equations 13 and 24.

$(x(t+1|t) \leftarrow x(t|t))$ [Expression 33]

[Expression 34]

$x = Fx$ (Equation 13)

$P = FPF^T + GQG^T$ (Equation 14)

In addition, a filtering result represented by Expression 35 is obtained according to the expression below.

$(x(t|t) \leftarrow x(t|t-1), P(t|t) \leftarrow P(t|t-1))$ [Expression 35]

[Expression 36]

$K = PH^T/(HPH^T + R)$ (Equation 15)

$x_{fil} = x + K(y_{obs} - Hx)$ (Equation 16)

$y_{fil} = Hx_{fil}$ (Equation 17)

That is, a filtering value represented by Expression 37 is obtained as intended camera work component in the current frame.

$y_{fil} = [t_x, t_y, t_z, q_w, q_x, q_y, q_z]^T$ [Expression 37]

In addition, a difference between a state variable value of the current frame and the filtering value is obtained as a value which will become a shake correction quantity.

A quaternion component of an attitude is inversely transformed into a rotation matrix, and a difference between the actual trajectory and a camera work trajectory intended by the user is calculated according to the equations below.

[Expression 38]

$R_{t\_n} = R_{stb\_n}^{-1} R_n$ (Equation 18)

$T_{t\_n} = T_n - T_{stb\_n}$ (Equation 19)

$R_{stb\_n}$ and $T_{stb\_n}$ [Expression 39]

Expression 39 represents an attitude and a position of a camera work trajectory when intended camera work is performed in the current frame. Accordingly, position and attitude correction quantities of the n-th frame are obtained as follows.

$R_{t\_n}$ and $T_{t\_n}$

In the present embodiment, a method of obtaining a position attitude value of the camera in intended camera work through filtering using a linear Kalman filter is described. The present invention is not limited thereto and other methods using an extended Kalman filter (EKF), a nonlinear Kalman filter (UKF) or the like may be used.

Figure 6A:
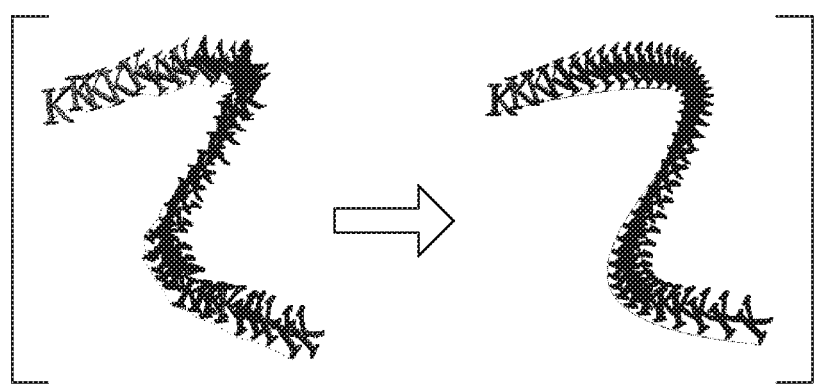
FIGS. 6A and 6B are diagrams illustrating suppression of shake according to correction according to the position and attitude of an image pickup apparatus.

Effects according to filtering of position and attitude information of the camera will be described with reference to FIGS. 6A and 6B. FIG. 6A is a diagram for describing correction of an attitude of the camera. In the figure, the direction of character K indicates an attitude of the camera. The left diagram of FIG. 6A shows a state including vibration corresponding to camera work that is not intended by the user. In this state, a photographing direction of the camera changes at a high frequency. This state changes to the state shown in the right diagram when the camera work that is not intended by the user is eliminated. This state shows smooth variations in the camera attitude from which high-frequency changes have been removed.

Figure 6B:
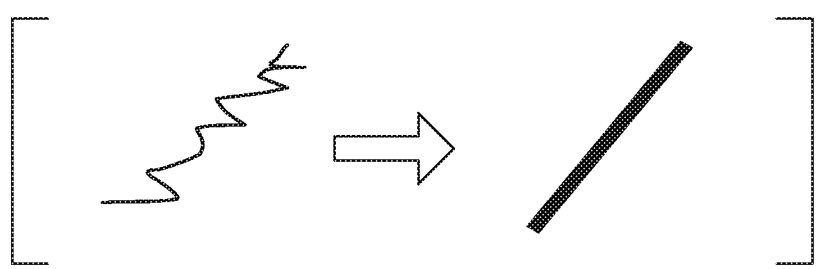

In addition, FIG. 6B is a diagram for describing camera position correction. The left diagram shows a state including high-frequency positional variations, that is, vibration corresponding to unintended camera work. A correction process is performed by filtering information on the position attitudes of the camera having the high-frequency positional variation as unintended camera work. Accordingly, the state can change to a state of drawing a smooth linear camera position trajectory, as shown in the diagram on the right side.

Incidentally, in a filtering process using a Kalman filter, a Kalman filter coefficient of each component is simply adjusted. Accordingly, it is possible to continuously adjust a degree of shake correction from a shake correction state in which all motions are corrected to a state without shake correction with respect to camera position and attitude variations.

In addition, effects are insignificant in general shake correction even when shake suppression is applied with respect to camera movement in the optical axial direction represented by the following.

$$t_z \quad \text{[Expression 41]}$$

Accordingly, correction is mitigated by adjusting a variance of system noise or correction is not performed by excluding the same from a state variable item of a Kalman filter in many cases.

Figure 7A:
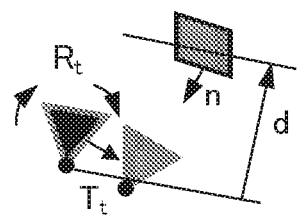
FIGS. 7A and 7B are diagrams illustrating suppression of shake according to electronic shake correction.

Further, a correction quantity used for electronic shake correction is calculated from a camera position/attitude correction quantity and a mixture ratio of image compositing (synthetic mixture ratio) is calculated in S103 of FIG. 5. Correction of a position and attitude of the camera will be described with reference to FIGS. 7A and 7B. FIG. 7A illustrates a planar subject having no thickness which is positioned at a distance d from an image surface of the camera. A three-dimensional position of the camera with respect to the planar subject is represented by Expression 42 and an attitude of the camera is represented by Expression 43.

$$T_{t\_n} \quad \text{[Expression 42]}$$

$$R_{t\_n} \quad \text{[Expression 43]}$$

The normal direction of the planar subject having no thickness is represented by a normal vector below.

$$\vec{n} \quad \text{[Expression 44]}$$

Variations in an image due to correction of the position and attitude of the camera are represented by the following expressions according to conversion using homography.

[Expression 45]

$$H \cong R_{t\_n}^T - \frac{1}{d} R_{t\_n}^T \vec{T}_{t\_n} \vec{n}^T \quad \text{(Equation 20)}$$

$$\tilde{X}_0 = \begin{bmatrix} x - C_x \\ y - C_y \\ 1 \end{bmatrix} \quad \text{(Equation 21)}$$

An image of the planar subject after correction of the camera position attitude, represented by Expression 46, is obtained according to coordinate transformation formulated by Expression 47.

[Expression 46]

$$(x', y')$$

[Expression 47]

$$\tilde{X} = \begin{bmatrix} x'' \\ y'' \\ m'' \end{bmatrix} = H\tilde{X}_0, \quad x' = (x''/m'') + C_x, \quad \text{(Equation 22)}$$

$$y' = (y''/m'') + C_y$$

Figure 7B:
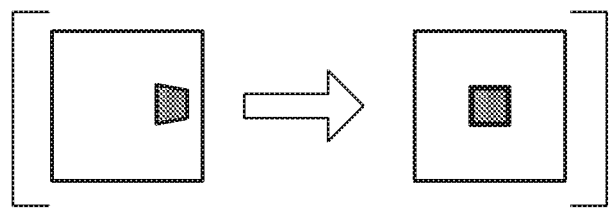

In FIG. 7B, the left diagram shows an image before transformation and the right diagram shows an image after transformation. In practice, an image geometrically consistent with an image captured by moving the camera to the position represented by Expression 48 and with the attitude represented by Expression 49 is acquired.

$$\text{Position } T_{t\_n} \quad \text{[Expression 48]}$$

$$\text{Attitude } R_{t\_n} \quad \text{[Expression 49]}$$

In the case of the planar subject having no thickness positioned at the distance d from the image surface, as shown in FIG. 7A, an electronic shake correction process is executed on a captured image according to an acquired correction quantity with respect to the position and attitude of the image pickup apparatus. By simply performing this process, it is possible to acquire a stabilized image which looks as if it is captured at a camera work viewpoint and camera attitude intended by the user.

Figure 8A:
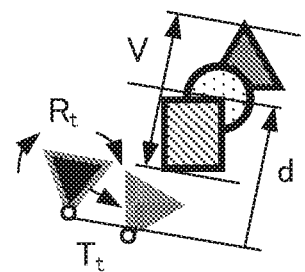
FIGS. 8A and 8B are diagrams illustrating remaining parallax differences during shake suppression according to electronic shake correction.
Figure 8B:
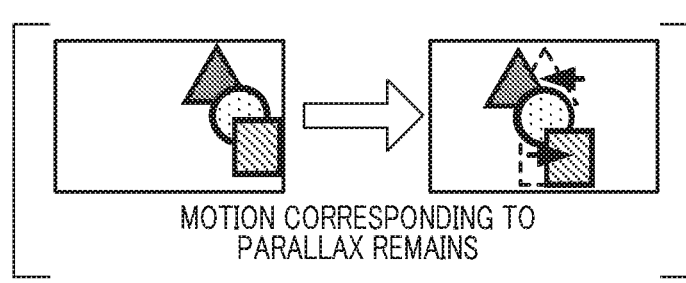

In realistic photography scenes, however, a subject has a thickness in the depth direction or a captured image includes a plurality of subjects and a region in which the subjects are present extends in the depth direction in many cases. FIG. 8A is a schematic diagram showing a photography scene when a plurality of subjects "□," "○" and "Δ" are present within a distance range V in the depth direction. In such a case, sufficient correction may not be performed when the electronic shake correction based on the assumption that the subjects are planar subjects is executed. There is a likelihood of variations in parallax differences between subject images remaining after correction, as shown in FIG. 8B. That is, an image of the main subject "○" (subject which is a main target) at a distance d set therefor is a still image, but a motion of parallax differences remains in images of the subject before and after the still image. Such a motion is a motion corresponding to parallax differences canceled out by making the subject at the distance d stand still. FIG. 8B shows a state in which a stabilized image which looks as if it is geometrically consistent with an image captured by actually moving the camera to the position represented by Expression 50 and with the attitude represented by Expression 51 is acquired only for the subject at the assumed distance d as in the case of a planar subject having no thickness.

Position $T_{t\_n}$ [Expression 50]

Attitude $R_{t\_n}$ [Expression 51]

However, a motion of parallax differences remains in prior and subsequent images of the subject present in a space which is not present on a plane corresponding to a normal vector represented by Expression 52 at the distance d.

$\vec{n}$ [Expression 52]

The right diagram of FIG. 8B shows change to an image in which a parallax generated between viewpoint images remains, which looks like an image captured through a pupil division optical system. The subject at the distance d which is a main target becomes stationary and is a fulcrum point and motions reversed before and after the fulcrum point, like a seesaw motion, remain. A process of generating a virtual viewpoint image by combining a plurality of viewpoint images while controlling a mixture ratio thereof is performed for the remaining parallax differences. A process of acquiring a stabilized image in which the remaining parallax differences have been canceled out will be described. When the process of generating a virtual viewpoint image according to mixture ratio control is performed, an image which looks as if a viewpoint has moved therein can be created. Accordingly, parallax differences may also be processed through shake correction by generating a virtual viewpoint image such that a counter parallax, that is, a parallax against differences, is generated for the remaining parallax differences.

Virtual viewpoint image generation according to mixture ratio control shown in S104 of FIG. 5 will be described. A subject is photographed at a plurality of slightly different viewpoints to acquire a plurality of viewpoint images. As a method of generating a free viewpoint image at any virtual viewpoint from the plurality of acquired viewpoint images, that is, parallax images, view morphing (Seitz, S. M., & Dyer, C. R. (1996). "View Morphing", In Siggraph 1996 Conference Proceedings, Annual Conference Series, pp. 21-30.) may be provided. This method generates a free viewpoint image according to inter-extrapolation. An image at a virtual viewpoint is generated using a view morphing technique.

Figure 9A:
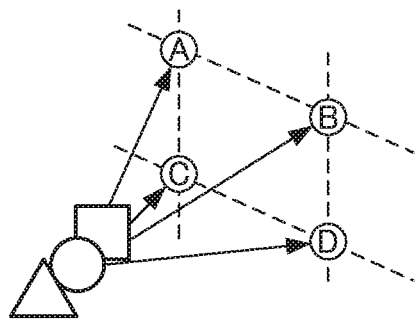
FIGS. 9A to 9D are diagrams illustrating generation of a virtual viewpoint image according to mixture ratio control.
Figure 9B:
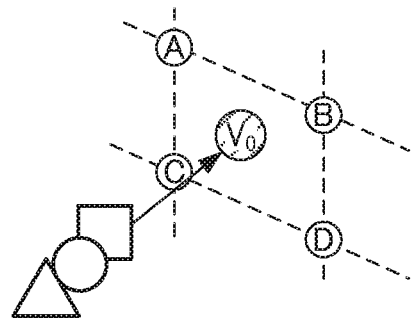

Generation of an image at a virtual viewpoint according to mixture ratio control will be described with reference to FIGS. 9A to 9D. FIG. 9A shows positional relationships between four imaging viewpoints A to D and a plurality of subjects when the viewpoints are two-dimensionally expanded in the vertical and horizontal directions. A positional relationship between the plurality of subjects is the same as in FIGS. 8A and 8B. FIG. 9B shows positional relationships between the four viewpoints A to D and the plurality of subjects and a virtual viewpoint. The virtual viewpoint is denoted by V0. An example of compositing a virtual viewpoint image like a captured image of a subject from the virtual viewpoint V0 different from the four viewpoints A to D by controlling a mixture ratio of two or more viewpoint images will be described.

A process of setting a virtual viewpoint position to determine a mixture ratio is performed on the basis of components of a camera position correction quantity calculated in the camera position/attitude correction quantity calculation process S102 of FIG. 5, which are perpendicular to the optical axis and are represented by Expression 53.

[Expression 53]

$T_{t\_n\_x}$ (x component)

$T_{t\_n\_y}$ (y component)

The mixture ratio corresponds to an image compositing ratio, and a virtual viewpoint image is generated according to weighted addition using the ratio.

Specifically, viewpoint images captured at the four imaging viewpoints A, B. C and D are respectively denoted by viewpoint images R1, R2, R3 and R4. Weighting coefficients according to the positional relationships between the four imaging viewpoints A, B, C and D and the virtual viewpoint $V_0$ are determined. Four coefficients are represented by $\alpha$, $\beta$, $\delta$ and $\epsilon$. A virtual viewpoint image is represented by Rv. This is produced through a compositing process using Equation 23 below. For example, the coefficients $\alpha$, $\beta$, $\delta$ and $\epsilon$ corresponding to the mixture ratio of the viewpoint images R1, R2, R3 and R4 may be calculated using Equations 24 to 27 below.

$R_V = (\alpha \times R1 + \beta \times R2 + \delta \times R3 + \epsilon \times R4)$ (Equation 23)

$\alpha = (LX/LH) \times (LY/LV)$ (Equation 24)

$\beta = (1 - LX/LH) \times (LY/LV)$ (Equation 25)

$\delta = (LX/LH) \times (1 - LY/LV)$ (Equation 26)

$\epsilon = (1 - LX/LH) \times (1 - LY/LV)$ (Equation 27)

$\alpha + \beta + \delta + \epsilon = 1$ (Equation 28)

Figure 9C:
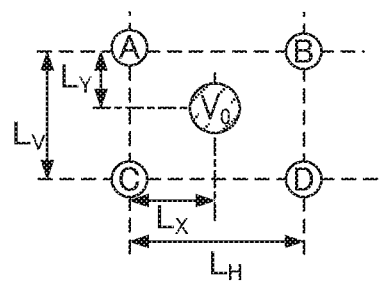

In the above equations, LH, LV, LX and LY are shown in FIG. 9C.

LH: A horizontal baseline length which is a distance between imaging viewpoints in the horizontal direction LV: A vertical baseline length which is a distance between imaging viewpoints in the vertical direction LX: A deviation between a virtual viewpoint and an imaging viewpoint in the horizontal direction ($0 \leq LX \leq LH$)

LY: A deviation between a virtual viewpoint and an imaging viewpoint in the vertical direction ($0 \leq LY \leq LV$)

In addition, as represented by the above equations, coefficient values are set such that the sum of values of the coefficients $\alpha$, $\beta$, $\delta$ and $\epsilon$ becomes 1. Accordingly, when the viewpoint images R1, R2, R3 and R4 are images having the same brightness, it is possible to generate the virtual viewpoint image $R_V$ having the same brightness.

Figure 9D:
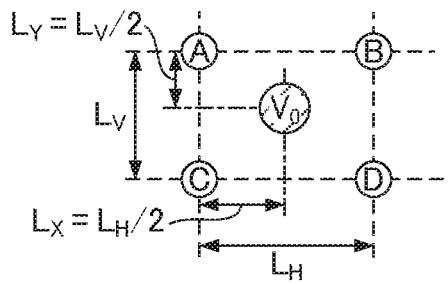

FIG. 9D illustrates a case in which the virtual viewpoint V0 is positioned at the center of a region surrounded by the four imaging viewpoints A, B, C and D. That is, LX=LH/2 and LY=LV/2 and all the values of the coefficients $\alpha$, $\beta$, $\delta$ and $\epsilon$ are 0.25 in Equations 23 to 28. The four viewpoint images R1, R2, R3 and R4 are composited at equal proportions to generate the virtual viewpoint image RV.

Here, a viewpoint position before shake correction is set to the center position of a viewpoint of a parallax image. In addition, Expression 55 is determined from the components of the camera position correction quantity, which are perpendicular to the optical axis and are represented by Expression 54.

$T_{t\_n\_x}$ and $T_{t\_n\_y}$ [Expression 54]

$L_x = -T_{t\_n\_x} + L_H/2$ $L_y = -T_{t\_n\_y} + L_V/2$ [Expression 55]

In addition, values of the coefficients α, β, δ and ε for generating a virtual viewpoint image when the camera is moved to a position perpendicular to the optical axis through the components represented by Expression 56 are calculated.

[Expression 56]

$$T_{t\_n\_x} \quad \text{(x component)}$$

$$T_{t\_n\_y} \quad \text{(y component)}$$

It is possible to correct a parallax component remaining through shake correction by determining a mixture ratio of a plurality of viewpoint images. That is, it is possible to cancel out parallax differences remaining when a subject has a thickness in the depth direction or a captured image includes a plurality of subjects and a region in which the subjects are present extends in the depth direction.

Figure 10:
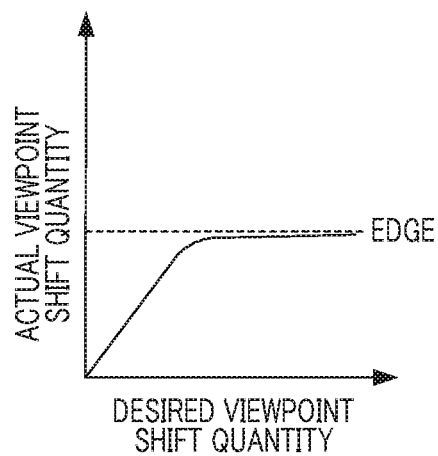
FIG. 10 is a diagram illustrating edge processing.

Although extrapolation may also be represented using negative values for LX and LY, occlusion in which image information does not exist is generated. Edge processing is performed such that a virtual viewpoint generation position does not protrude from a range of baseline lengths. An example is shown in FIG. 10. The horizontal axis represents a desired viewpoint shift quantity and the vertical axis represents an actual viewpoint shift quantity. A process of accepting a shift of viewpoint to be actually performed through mixture ratio control is performed within a baseline length range surrounded by viewpoint positions of a plurality of viewpoint images using the viewpoint shift quantity calculated in S103 of FIG. 5 as an input. That is, when the input viewpoint shift quantity increases, there is saturation at the edge with respect to the viewpoint shift quantity. Further, the viewpoint shift quantity according to virtual viewpoint image generation based on mixture ratio control may not necessarily be consistent with the components of the camera position correction quantity, which are perpendicular to the optical axis, in shake correction.

In the present embodiment, a virtual viewpoint image is generated by compositing captured viewpoint images while performing weighting according to positional relationships between virtual viewpoints and imaging viewpoints. The image compositing unit 104 outputs data of the generated virtual viewpoint image RV to the shake correction unit 103.

Meanwhile, when simply virtual viewpoint image generation according to mixture ratio control is performed, it is not possible only to cancel out parallax differences between subject images. Virtual viewpoint positions and line of sight directions of images generated through the virtual viewpoint image generation process according to view morphing using a plurality of viewpoint images as inputs will be schematically described with reference to FIGS. 11A to 11E. FIGS. 11A to 11E are diagrams for describing viewpoint shifting and line of sight direction variation secondarily occurring in virtual viewpoint image generation and show examples of two viewpoints in the horizontal direction.

Figure 11A:
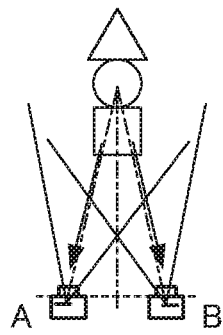
FIGS. 11A to 11F are diagrams illustrating variations in images secondarily generated in virtual viewpoint image generation.
Figure 11B:
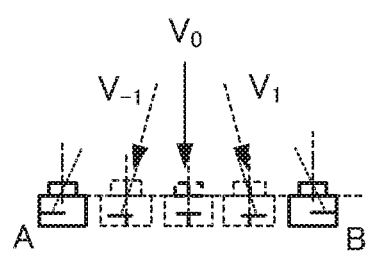
Figure 11C:
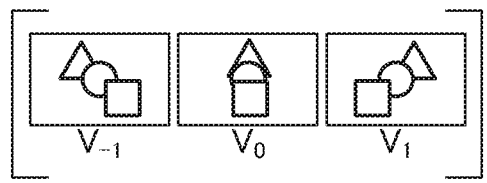

FIG. 11A is a schematic diagram showing photographing positions of actually captured viewpoint images at two viewpoints A and B. This is a state in which a plurality of subjects are regarded as being congested and corresponds to a case of a pupil division system. In this case, image surface shifting effects are added. A process of generating virtual viewpoints according to view morphing is shown in FIG. 11B. Three generated virtual viewpoints V0, V1 and V-1 which are positioned between the two viewpoints A and B are illustrated. When a mixture ratio is changed, viewpoint positions, line of sight directions and an image surface shift quantity continuously smoothly change between the actually captured viewpoint images according to the mixture ratio change. FIG. 11C shows virtual viewpoint images at the virtual viewpoints V0, V1 and V-1. For example, a virtual viewpoint image shown at the center of FIG. 11C is generated at the central viewpoint. In virtual viewpoint image generation according to mixture ratio control of a plurality of viewpoint images in a pupil division system, parallax differences appear as if they have been canceled out. However, image variations corresponding to parallax variations and line of sight direction variations are actually added as can be ascertained from a geometrical relationship between the generated viewpoints shown in FIG. 11B. Parallax variations are overall parallax variation according to positional variations (Lx, Ly) of imaging viewpoints in association with virtual viewpoint shifting during virtual viewpoint image generation, and image variations corresponding to line of sight direction variations converging on a focus distance position at which the parallax variations are canceled out are added. That is, when parallax differences are intended to be canceled out, a parallel shift due to shifting of viewpoint shift corresponding to values canceled out through shake correction, which are represented by Expression 57, is also canceled out and thus excess correction occurs.

$$T_{t\_n\_x} \text{ and } T_{t\_n\_y} \quad \text{[Expression 57]}$$

Furthermore, the influence of unnecessary image surface shift variations is added in the case of the pupil division photography system and the light field photography system.

Here, a line of sight direction of a virtual viewpoint in the pupil division photography system and the light field photography system corresponds to an image surface shift quantity represented by Expression 58 and, when the focal distance of a micro-lens is represented by fml, it may be calculated as an image surface shift quantity using equations of Expression 59.

[Expression 58]

$$IM_{shift\_H} \text{ or } IM_{shift\_V}$$

[Expression 59]

$$IM_{shift\_H} = f_{ml} \frac{2Lx - LH}{2d} \quad \text{(Equation 29)}$$

$$IM_{shift\_V} = f_{ml} \frac{2Ly - LV}{2d} \quad \text{(Equation 30)}$$

Although it is difficult to recognize variations in the line of sight direction caused by image surface shifting through FIG. 11C, the variations cause image distortion and thus are not desirable for images. Accordingly, when remaining parallax differences between subjects are canceled out according to generation of a virtual viewpoint image, a process of respectively subtracting positional variations (Lx, Ly) of an imaging viewpoint which additionally occur according to virtual viewpoint shifting from components of the camera position correction quantity, which are perpendicular to the optical axis and are represented by Expression 60, is performed.

[Expression 60]

$$T_{t\_n\_x} \quad \text{(x component)}$$

$$T_{t\_n\_y} \quad \text{(y component)}$$

Simultaneously, a process of canceling out the influence of additionally occurring image surface shifting is performed. It is possible to prevent or suppress excess correction caused by simultaneous execution of suppression of shake based on a shake correction process according to geometrical deformation of an image based on a correction quantity of camera position/attitude variations and generation of a virtual viewpoint image according to mixture ratio control of a plurality of viewpoint images according to a process represented by the following expressions.

[Expression 61]

$$X_0 = \begin{bmatrix} d(x - C_x - IM_{shift\_H})/f \\ d(y - C_y - IM_{shift\_V})/f \\ d \end{bmatrix}$$ (Equation 31)

$$\tilde{X} = \begin{bmatrix} x'' \\ y'' \\ m'' \end{bmatrix} = R_{t\_n}^{-1} X_0 - R_{t\_n}^{-1} T_{t\_n} - \begin{bmatrix} Lx & Ly & 0 \end{bmatrix}$$

$$x' = (f \cdot x''/m'') + C_x, \quad y' = (f \cdot y''/m'') + C_y$$ (Equation 32)

Figure 11D:
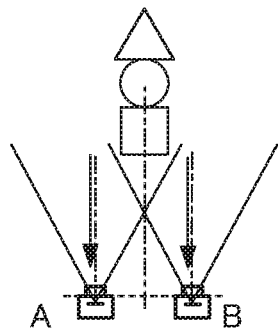
Figure 11E:
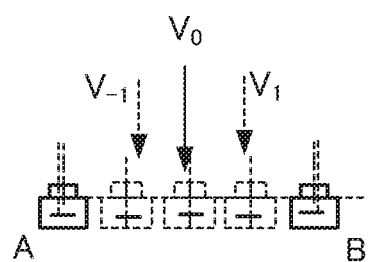
Figure 11F:
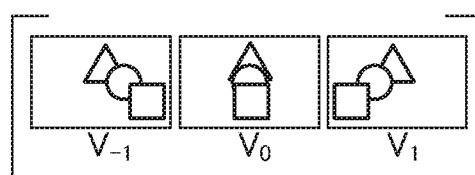

However, since correction of image surface shifting is correction of image coordinates and correction of an additional positional variation in an imaging viewpoint due to virtual viewpoint shifting is correction of an image, they have opposite signs. Meanwhile, a case in which an imaging unit has a configuration in which a plurality of image pickup apparatuses are arranged in an array (B. Wilburn, et. al., "High Performance Imaging Using Large Camera Arrays." p.p. 765-776, SIGGRAPH 2005) is illustrated in FIG. 11D. FIG. 11D is a schematic diagram of photographing positions of viewpoint images actually captured at two viewpoints A and B in the horizontal direction. Viewpoint positions and line of sight directions generated by changing a mixture ratio are shown in FIG. 11E. Virtual viewpoint images are shown in FIG. 11F. When remaining of parallax differences between subject images is intended to be canceled out through virtual viewpoint image generation, horizontal shifting of images which is viewpoint shifting corresponding to correction quantities which are canceled out through shake correction, represented by Expression 62, is further canceled out to cause excess correction, but image surface shifting does not occur.

$$T_{t\_n\_x} \text{ and } T_{t\_n\_y}$$ [Expression 62]

In addition, when the imaging unit is a pupil division photography system or a light field photography system, the baseline lengths LH and LV between viewpoints of parallax images momentarily change according to values of camera parameters. The camera parameters include the type, focus distance, F number which is an aperture value, etc. of the main lens. In the case of a zoom lens, a mixture ratio of a plurality of viewpoint images with respect to components (Expression 62) of the camera position correction quantity, which are perpendicular to the optical axis, cannot be determined unless the baseline lengths LH and LV are further determined according to a zoom state and the like. In the present embodiment, table data having the camera parameters as arguments is prepared in advance, and thus the baseline lengths LH and LV corresponding to the state of the imaging unit can be acquired. A specific example will be described with reference to FIGS. 12A and 12B.

Figure 12A:
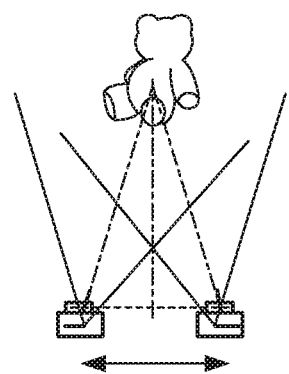
FIGS. 12A and 12B are diagrams illustrating variations in a baseline length between a plurality of viewpoint images.
Figure 12B:
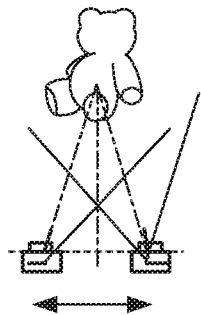

FIG. 12A shows a case in which a focus distance is far away and FIG. 12B shows a case in which a focus distance is near. In the figures, baselines are different and thus line of sight directions at respective viewpoints are different. Accordingly, a reference table which stores corresponding baseline lengths L (LH, LV) using the type, focus distance, F number which is an aperture value, information on a set of zoom states of the main lens as key information is prepared. The baseline lengths L can be acquired from the types, focus distances and F numbers corresponding to aperture values and zoom state information of the main lens. When the imaging unit is a pupil division photography system or the light field photography system, an image surface shift quantity is obtained from the baseline lengths and focus distance information.

When the above-described shake correction and shake correction of parallax differences according to virtual viewpoint image generation based on mixture ratio control are arbitrarily performed, overall parallax variation caused by viewpoint position variations during imaging undergo excess corrected. Furthermore, when the imaging unit is a pupil division photography system or a light field photography system, unintended image changes such as changes in the appearance of an image due to variations in an image surface shift quantity are added when virtual viewpoint image generation is performed.

Accordingly, there is appropriate cooperation between correction performed by the shake correction unit 103 and shake correction of parallax differences according to virtual viewpoint image generation using mixture ratio control in the present embodiment. Specifically, in correction performed by the shake correction unit 103, a process of subtracting viewpoint position variations caused by virtual viewpoint image generation from a camera position correction quantity is performed in correction quantity calculation. In addition, when the imaging unit is a pupil division photography system or a light field photography system, correction corresponding to image changes caused by variations in an image surface shift quantity is additionally performed in the shake correction process. Accordingly, in cases in which a subject has a thickness in the depth direction or a captured image is composed of a plurality of subjects and a region including the subjects extends in the depth direction, which cannot be corrected using only normal electronic shake correction, shake correction can be performed. Since image change due to remaining parallax differences can be canceled out through the virtual viewpoint image generation process according to mixture ratio control which is correction in cooperation with shake correction, it is possible to prevent harmful effects such as addition of unnecessary motion in images.

In the virtual viewpoint image compositing step S104 of FIG. 5, the image compositing unit 105 composites the plurality of captured viewpoint images on the basis of the mixture ratio calculated in S103 to generate a virtual viewpoint image which is a composite image and outputs the composite image to the shake correction unit 103. From the viewpoint of electronic image shake correction in the next step S105, the aforementioned parallax differences are canceled out and thus an image which appears as if the depth of a subject has been shortened to a focus distance position is obtained.

In step S105, the shake correction unit 103 performs a geometrical deformation process on the basis of a correction quantity with respect to the electronic shake correction quantity calculated in step S103 to output data of a stabilized frame image. A process of subtracting image changes caused by positional variations added to the composite image generated in step S104 and a process of correcting image changes due to added image surface shift quantity variations through geometrical deformation are performed. Accordingly, it is possible to cope with image changes secondarily added according to virtual viewpoint image compositing and obtain a stabilized image corresponding to camera work intended by the user. An image surface shift quantity of the composite image is calculated using virtual viewpoint positions, obtained from baseline lengths acquired from the reference table having a mixture ratio of the correction quantity from the center position of FIG. 9D and camera parameters as arguments, and an azimuth angle obtained at the focus distance. The shake correction unit 103 performs a process of correcting image surface coordinates by shifting the image surface coordinates by the calculated image surface shift quantity (image surface shift correction).

Figure 13A:
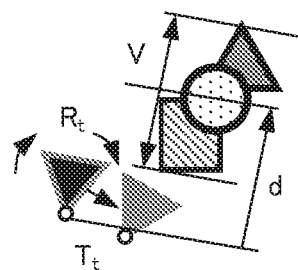
FIGS. 13A and 13B are diagrams illustrating shake correction effects according to the present embodiment.
Figure 13B:
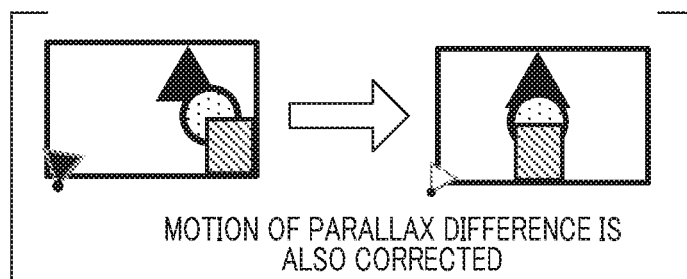

FIGS. 13A and 13B are schematic diagrams for describing correction effects of the present embodiment. FIG. 13A is the same as FIG. 8A. FIG. 13B shows an image before correction on the left side and shows an image after correction on the right side. A vertically aligned corrected image is obtained as a subject image which appears as if it has been captured from a viewpoint and with a camera attitude at which the position and attitude of the camera have been moved by the correction quantity. An image in which parallax differences caused by the depth of the subject space have also been geometrically correctly corrected can be acquired.

In the present embodiment, it is possible to generate an image in which shake due to variations in the attitude and position of the image pickup apparatus and the influence of changes in parallax differences caused by viewpoint shifting have been simultaneously suppressed or canceled out. In image shake correction in response to positional variations or attitude variations of the image pickup apparatus, it is possible to obtain an image in which shake due to hand shake or the like and a motion of an image secondarily added during image compositing have been corrected.

[Second Embodiment]

Figure 14:
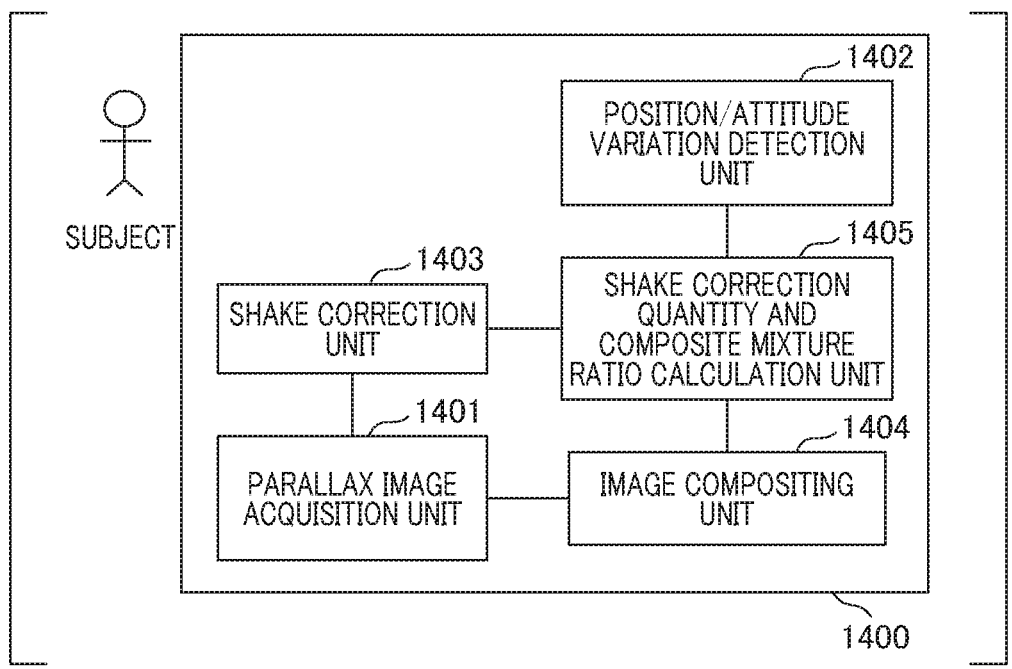
FIG. 14 is a schematic diagram illustrating an image pickup apparatus according to a second embodiment.

Hereinafter, a second embodiment will be described. FIG. 14 is a block diagram showing a configuration of an image pickup apparatus 1400 according to the present embodiment. In the present embodiment, a parallax image acquisition unit 1401, a position/attitude detection unit 1402 and an image compositing unit 1404 have the same functions as the parallax image acquisition unit 101, the position/attitude detection unit 102 and the image compositing unit 104 of FIG. 1. Accordingly, detailed description thereof is omitted and only differences will be described. Such omission of description applies similarly to the embodiment which will be described later.

A shake correction unit 1403 of the present embodiment performs optical image shake correction. For example, there is shake correction for obtaining shake suppression effects by moving a correction lens such as a shift lens constituting part of an imaging optical system. In addition, there are imager shake correction for obtaining shake suppression effects by moving an imaging element, barrel shake correction for obtaining shake suppression effects by rotating the entire barrel around the horizontal axis and the vertical axis, and the like. Optical image shake correction is applied to beams before being received through an imaging element. There are methods of performing each shake correction method alone and methods of appropriately combining shake correction methods.

A shake correction quantity and composite mixture ratio calculation unit 1405 calculates camera work of a vibrating component different from camera work intended by a user using detection information on variations in the position and attitude of the image pickup apparatus 1400 as an input in a shake correction quantity calculation process. The calculation unit 1405 calculates a shake correction quantity on the basis of a range correctable by the shake correction unit 1403 which performs optical image shake correction, past shake suppression states, and the like. In addition, the calculation unit 1405 calculates a mixture ratio of parallax images in image compositing in a compositing mixture ratio calculation process.

A process of the present embodiment will be described with reference to FIG. 15. A process of S201 is the same as S101 of FIG. 5 described in the first embodiment and thus description thereof is omitted. In S202, the calculation unit 1405 inputs the amount of changes in the attitude or position of the camera or both thereof up to the current frame, acquired in S201, to a filter and processes the amounts of change. The filter is an infinite impulse response (IIR) filter or a finite impulse response (FIR) filter.

The calculation unit 1405 determines a shake correction quantity for variation in the attitude or position of the camera or both thereof based on camera work which is not intended by the user as an optical shake correction target. For example, in the case of shake correction performed by moving a correction lens constituting part of an imaging optical system, a translational component which is a linear term of a Taylor expansion of an image change amount with respect to a rotation amount (rotation angle θ) of the camera is controlled such that shake thereof is reduced by driving the correction lens. It is possible to correct a yaw component and a pitch component with respect to rotation of the camera, and a component with respect to a positional variation of the camera, which is perpendicular to the optical axis. The translational component is a physical quantity which is obtained as an optical shake correction effect and represents variation in coordinates due to parallel shifting of an image. When the imaging optical system is a zoom lens system, a horizontal shift quantity of an image changes when the focal distance changes even when detected camera rotation amounts have not changed. Accordingly, a plurality of control physical quantities composed of a rotation amount and a horizontal shift amount of the camera and the focal distance are handled as a set in consideration of easy handling in control. For example, one piece of optical shake correction control information may be determined as a value scheduled to become a horizontal shift quantity of an image on a sensor surface when the information is multiplied by the focal distance f of the optical system. That is, a rotation angle of the camera is set to θ and handled as an angle through the equation.

[Expression 63]

$$Sh = f \tan\theta \approx f\theta, \quad \theta = \tan^{-1}(Sh/f) \approx Sh/f \quad \text{(Equation 33)}$$

"Sh" is a shift quantity of a correction lens (shift lens) and is 0 when a movable part of an optical shake correction mechanism is at a neutral position.

It is possible to assign a correction quantity with respect to positional variations of the camera in the vertical direction and the horizontal direction with respect to the optical axis as a rotation drive quantity as represented by Equation 34 using Equation 33.

[Expression 64]

$$\theta = \tan^{-1}(Tf/d) \approx Tf/d \quad \text{(Equation 34)}$$

In Equation 34, T is a position correction quantity and d is a distance to a subject which is a correction target. Accordingly, in optical shake correction, it is possible to obtain a stabilized image which appears as if it has been captured at a viewpoint of camera work intended by the user for capturing images as in the case of electronic shake correction in the present embodiment. As described in the first embodiment, it is possible to obtain a stabilized image in which shake of an image frame has been suppressed with respect to the camera position by simply performing optical shake correction when a subject is a planar subject having no thickness positioned at a distance d. In addition, when a subject has a thickness in the depth direction thereof or a captured image is composed of a plurality of subjects and a region including the subjects extends in the depth direction, parallax differences present between subject images remain even after correction in the optical shake correction process. The remaining parallax differences may be canceled out by generating a virtual viewpoint image through compositing according to mixture ratio control of parallax images in S205. A mixture ratio of image compositing is calculated according to the size and direction of a component of a correction quantity related to the position of the shake correction quantity, which is perpendicular to the optical axis.

In S203, a shake correction operation is performed on the basis of a drive quantity according to the shake correction quantity calculated in S202 to obtain shake suppression effects. In the next step S204, the imaging element receives beams imaged on the imaging element through the main lens and micro-lenses and performs photoelectric conversion thereon to acquire parallax images. Here, in the case of an imaging unit of a pupil division photography system or a light field photography system, image surface shifting may occur in the parallax images. Accordingly, a correction process of canceling out the influence of image surface shifting by shifting the image surface to read an image signal is performed. When image surface shift correction is performed in the parallax image acquisition step, the image surface shift problem mentioned in compositing of the virtual viewpoint image in the first embodiment is not generated. In image surface shift correction, a reference table which has information about the type, focus distance, F number and a set of zoom states of the main lens as key information and stores corresponding baseline lengths L (LH, LV) is used as in shift correction of the first embodiment. That is, baseline lengths may be acquired according to the type, focus distance, F number and zoom state of the main lens. Since an image surface shift quantity of each viewpoint image is determined from a baseline length, it is possible to determine the correction quantity and perform image surface shift correction. Image surface shift correction will be described with reference to FIGS. 16A to 16F.

Figure 16A:
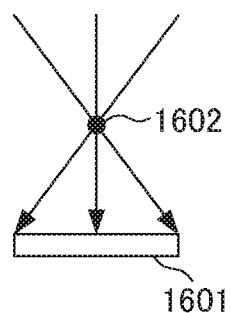
FIGS. 16A to 16F are diagrams illustrating image surface shifting correction.
Figure 16B:
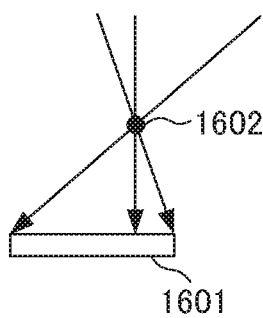
Figure 16C:
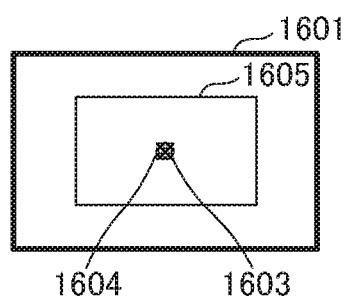
Figure 16D:
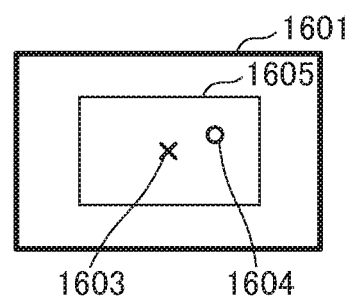
Figure 16E:
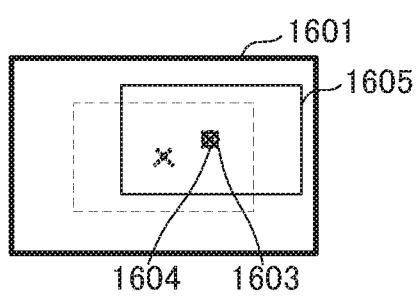

FIGS. 16A and 16B are diagrams showing a relationship between an imaging element 1601 and an image-side principal point position 1602 of an imaging optical system. When viewed from the upstream side (subject side) of the optical axis in FIG. 16A, an image center 1603 which is the intersection of the optical axis of an imaging optical system and the imaging element corresponds to the center 1604 of an image read from the imaging element 1601, as shown in FIG. 16C. A rectangular frame 1605 within an imaging element area is an image signal reading region. Meanwhile, FIG. 16D corresponding to the state of FIG. 16B is a diagram showing a relationship between the imaging element 1601 in a state in which image surface shifting has occurred and the image-side principal point position 1602 of the imaging optical system. As shown in FIG. 16D, a deviation is generated in the positional relationship between the image center 1603 which is the intersection of the optical axis of the imaging optical system and the imaging element and the center 1604 of the image read from the imaging element 1601. Such deviation is removed or reduced through image surface shift correction by moving the position at which the image is read from the imaging element 1601. FIG. 16E shows a state in which image surface shift correction has been performed by moving the position at which the image signal is read. The image center 1603 corresponds to the center 1604 of the read image in the rectangular frame 1605.

Figure 16F:
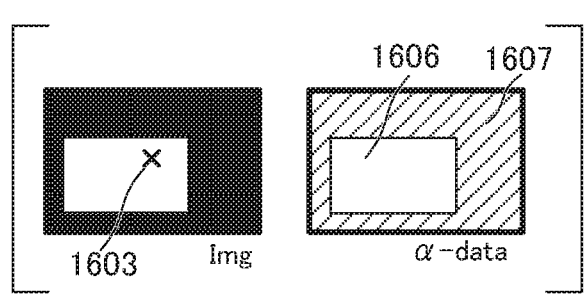

Image surface shift correction of viewpoint images may be realized by adding additional data which represents an image center additionally and padding a non-image region to distinguish an image region using a value α. Alternatively, image surface shift correction may be realized by devising a data format in which the size of each viewpoint image varies according to a shift quantity or adding image processing. FIG. 16F shows an example of displaying an image by padding a non-image region with a margin instead of setting the image center to the center of an output image without adding additional data representing the image center. The image center 1603 indicates an image center which is not actually present on the image and is positioned at the center of the output image. The data is expressed such that an image region obtained by moving an image region with respect to the image center within the output image and receiving light can be recognized in an α map. In the image of the left side of FIG. 16F, a white region in the image represents a region to which a beam is input and a black region represents a padded region. An example of the α map is shown on the right side of the FIG. 16F. With respect to an image region 1606, the value of the non-image region is allocated to the padded region of the image. When an image region including a padded region has the same size among a plurality of viewpoint images, handling is easy. It is possible to obtain data values acquired through an optical system in a state in which image surface shift correction has been performed. As described above, in the procedure of the reading process of the imaging element, details of image surface shift correction can be reflected in the format of the output image instead of being explicitly processed. Accordingly, the image surface shifting process becomes unnecessary during photographing. Image surface shift correction of parallax images can be performed after photographing using baseline length information ascertained from the reference table on the basis of image photographing conditions such as camera parameters during photographing.

Figure 15:
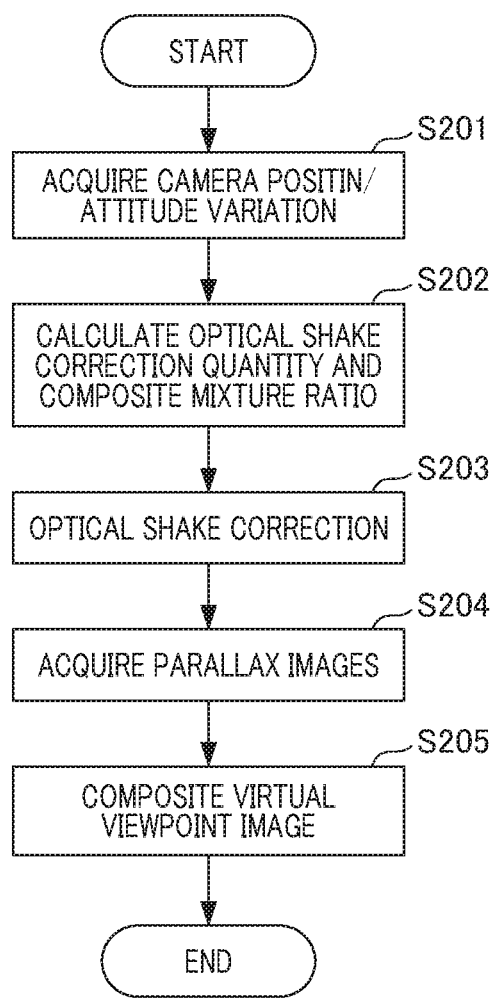
FIG. 15 is a flowchart illustrating a shake correction process according to the second embodiment.

In S205 of FIG. 15, the image compositing unit 1404 composites the plurality of parallax images acquired in S204 on the basis of the mixture ratio calculated in S202 to generate a virtual viewpoint image. Parallax differences in the shake-suppressed image are canceled out and thus an image which appears as if the depth of the subject has been compressed at the focus distance position is acquired.

In the present embodiment, shake suppression is performed before the imaging element receives beams according to optical shake correction. In this case, excess correction can be prevented by subtracting a viewpoint shift quantity secondarily generated due to compositing of a virtual viewpoint image according to mixture ratio control from a shake correction quantity in advance during shake suppression. Excess correction caused by cooperative processing of shake correction occurs in a conventional apparatus and virtual viewpoint image compositing according to mixture ratio control. In practice, when all viewpoint shift quantities secondarily generated according to mixture ratio control are subtracted from the correction quantity according to optical shake correction, an unstable image due to shake is generated. Accordingly, a process of subtracting frequency components lower than an intermediate degree such as sub fps (frames per second) which are able to be perceived from the correction quantity as an offset is performed. In addition, as a configuration including a plurality of optical shake correction unit, for example, there is a configuration in which a lens device includes a correction lens and a driving unit thereof as a first shake correction unit and a camera body unit includes a shake correction mechanism according to movement of an imaging element as a second shake correction unit. In such a case, it is necessary to subtract secondary viewpoint shift quantities according to mixture ratio control by combining the plurality of shake correction unit. Specifically, the first shake correction unit in the lens device independently performs shake correction as in the conventional technology. On the other hand, the second shake correction unit which drives the imaging element performs shake correction such that frequency components lower than an intermediate degree are subtracted with respect to image motion secondarily added according to mixture ratio control. An image shake correction operation is performed in cooperation with methods suitable for the plurality of shake correction unit.

With respect to the influence of image surface shifting which changes according to mixture ratio control in virtual viewpoint image generation, a correction quantity may be calculated from an image surface shift quantity acquired using a mixture ratio and the reference table and corrected in a process of reading an image signal from the imaging element.

In the present embodiment, it is possible to prevent or reduce excess correction when optical shake correction and virtual viewpoint image compositing according to mixture ratio control of parallax images are combined and performed. Accordingly, it is possible to obtain a captured image according to camera work intended by the user in which the influence of parallax differences caused by the depth of a subject space has been corrected.

[Third Embodiment]

Figure 17:
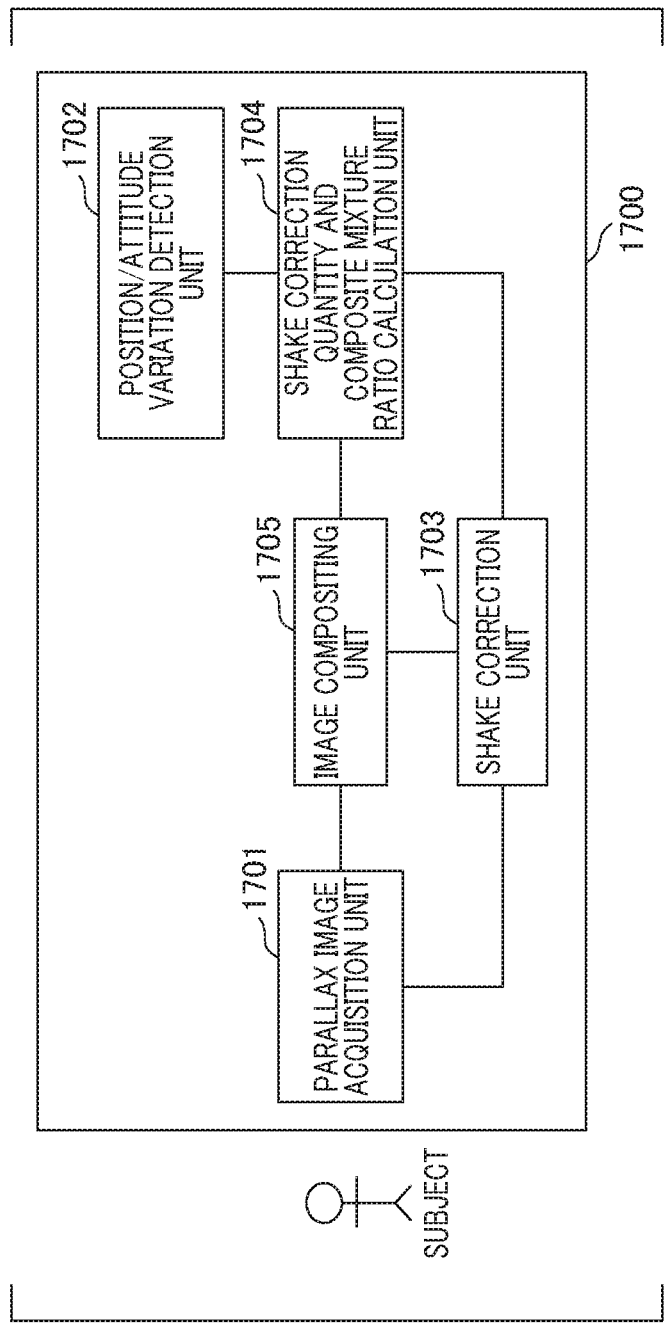
FIG. 17 is a schematic diagram illustrating an image pickup apparatus according to a third embodiment.
Figure 18:
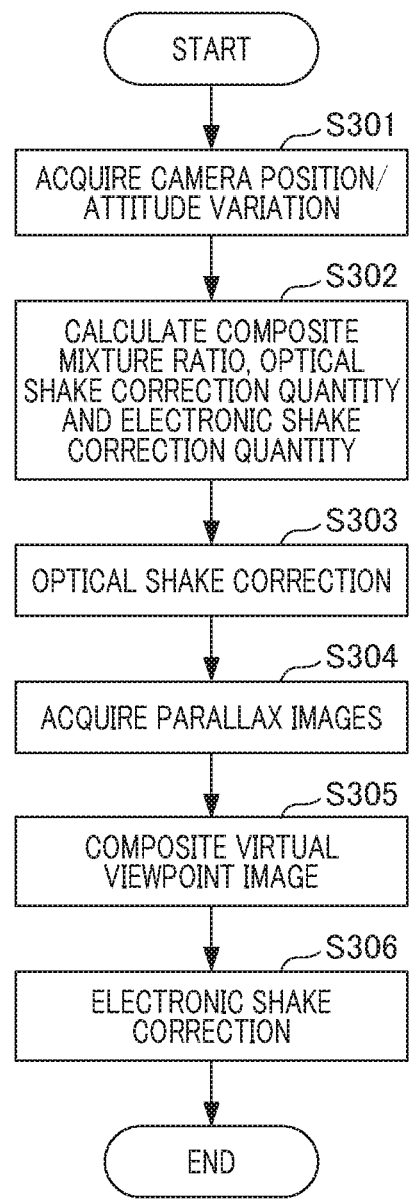
FIG. 18 is a flowchart illustrating a shake correction process according to the third embodiment.

A third embodiment will be described with reference to FIGS. 17 and 18. FIG. 17 is a block diagram showing a configuration of an image pickup apparatus 1700 according to the present embodiment. The present embodiment differs from the above-described embodiments in that an image stabilization unit 1703 includes both the electronic shake correction unit 103 of the first embodiment and the optical shake correction unit 1403 of the second embodiment. That is, in the present embodiment, shake correction in various manners may be performed using both electronic shake correction and optical shake correction. In the present embodiment, a parallax image acquisition unit 1701, a position/attitude detection unit 1702, an image compositing unit 1704 and a calculation unit 1705 have the same functions as the parallax image acquisition unit 101, the position/attitude detection unit 102, the image compositing unit 104 and the calculation unit 105 of FIG. 1 and thus detailed description thereof is omitted.

A process of the present embodiment will be described with reference to a flowchart of FIG. 18. Camera position/attitude variations are acquired in S301, and then a composite mixture ratio, an optical shake correction quantity and an electronic shake correction quantity are calculated in S302. Optical shake correction is performed in S303 and parallax images are acquired in S304. Then, a virtual viewpoint image is composited in S305 and electronic shake correction is performed in S306.

In S306, the shake correction unit 1703 corrects components such as in-plane rotation and aftereffects, which cannot be corrected through optical shake correction in S303, according to a geometrical deformation process. In the case of an imaging element having a rolling shutter function, rolling shutter distortion correction is performed. In addition, when image surface shift correction is not performed on the parallax images, image surface shift correction is applied when the virtual viewpoint image is composited of the parallax images according to mixture ratio control. When the influence of image surface shifting is not sufficiently corrected due to restrictions on processes performed by the imaging element, the influence of image surface shifting may be canceled out according to electronic correction (image processing). Further, the shake correction unit 1703 performs correction for eliminating or reducing remaining shake in optical shake correction in S303, that is, shake which is not corrected but remains.

In the present embodiment, optical shake correction, electronic shake correction, and virtual viewpoint image compositing according to mixture ratio control of parallax images are combined and performed. Accordingly, it is possible to acquire a high-quality captured image according to camera work intended by the user in which the influence of parallax differences caused by the depth of a subject space has been corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155705, filed Aug. 10, 2017 which is hereby incorporated by reference wherein in its entirety.

What is claimed is:

1. An image processing apparatus comprising:
   at least one processor and at least one memory functioning as:
   a first acquisition unit configured to acquire data of a plurality of viewpoint images having different viewpoints;
   a second acquisition unit configured to acquire the amount of change in a position of an imaging unit which has generated the data of the plurality of viewpoint images;
   a generation unit configured to generate data of an image having a viewpoint different from the plurality of viewpoint images using the data of the plurality of viewpoint images;
   a shake correction unit configured to correct shake of the viewpoint images or the image generated by the generation unit; and
   a calculation unit configured to calculate a correction quantity of the shake correction unit and a mixture ratio used when the generation unit generates the image using the amount of change acquired by the second acquisition unit.

2. The image processing apparatus according to claim 1, wherein the second acquisition unit further acquires the amount of change in an attitude of the imaging unit, and the calculation unit calculates the correction quantity and the mixture ratio corresponding to the amounts of changes in the position and the attitude acquired by the second acquisition unit.

3. The image processing apparatus according to claim 2, wherein the second acquisition unit acquires the amount of change in a position or an attitude of the imaging unit detected using the data of the plurality of viewpoint images.

4. An image pickup apparatus comprising:
the image processing apparatus according to claim 2;
the imaging unit; and
a detection unit configured to detect the amount of changes in a position and an attitude of the imaging unit,
wherein the second acquisition unit is the detection unit.

5. The image processing apparatus according to claim 1, wherein the calculation unit calculates the mixture ratio by calculating a weighting coefficient corresponding to a positional relationship between the viewpoints of the plurality of viewpoint images and a newly set viewpoint for each of the plurality of viewpoint images.

6. The image processing apparatus according to claim 1, wherein the calculation unit determines the mixture ratio based on information on a baseline length between viewpoints specified by one or more of the type, aperture value, zoom state and focus distance of an imaging optical system.

7. The image processing apparatus according to claim 6, comprising a correction unit configured to perform image surface shift correction for the plurality of viewpoint images using the baseline length information acquired from the calculation unit.

8. The image processing apparatus according to claim 7, wherein, when the generation unit generates data of an image, the correction unit performs image surface shift correction of the image.

9. The image processing apparatus according to claim 1, further comprising:
a correction unit configured to perform image surface shift correction for the plurality of viewpoint images.

10. The image processing apparatus according to claim 9, wherein the correction unit performs image surface shift correction when the data of the plurality of viewpoint images is acquired by the first acquisition unit.

11. An image pickup apparatus comprising:
the image processing apparatus according to claim 10; and
the imaging unit,
wherein the correction unit performs image surface shift correction by shifting an image signal reading region when the data of the plurality of viewpoint images is acquired in the imaging unit.

12. The image processing apparatus according to claim 1, wherein the calculation unit calculates the correction quantity from which the amount of change in viewpoint positions caused by variation in the mixture ratio has been subtracted and outputs the correction quantity to the shake correction unit, and
the shake correction unit performs shake correction on the viewpoint images or the image generated by the generation unit according to image processing.

13. An image pickup apparatus comprising:
the image processing apparatus according to claim 1; and
the imaging unit.

14. The image pickup apparatus according to claim 13, wherein the imaging unit receives beams which have passed through different pupil part regions of an imaging optical system and outputs signals of the plurality of viewpoint images.

15. The image pickup apparatus according to claim 14, wherein the imaging unit comprises a plurality of micro-lenses and a plurality of photoelectric conversion parts corresponding to each micro-lens, the imaging unit outputting the signals of the plurality of viewpoint images from the plurality of photoelectric conversion parts.

16. The image pickup apparatus according to claim 13, wherein the shake correction unit is an optical shake correction unit configured to correct shake for beams imaged by an imaging optical system and performs shake correction according to the correction quantity from which the amount of change in viewpoint positions caused by variation in the mixture ratio used when the generation unit generates an image has been subtracted.

17. The image pickup apparatus according to claim 13, comprising, as the shake correction unit, an optical shake correction unit configured to correct shake for beams imaged by an imaging optical system and an electronic shake correction unit configured to perform shake correction for the viewpoint images or the image generated by the generation unit through image processing,
wherein the optical shake correction unit performs shake correction based on a first shake correction quantity calculated by the calculation unit from the amount of change in a position or an attitude of the imaging unit, and
the electronic shake correction unit performs shake correction based on a second shake correction quantity calculated by the calculation unit from the amount of change in the position or the attitude of the imaging unit.

18. The image pickup apparatus according to claim 17, wherein the calculation unit calculates the first shake correction quantity from which the amount of changes in viewpoint positions caused by variation in a mixture ratio used when the generation unit generates the image has been subtracted.

19. An image processing method executed in an image processing apparatus which corrects shake of images by processing a plurality of viewpoint images having different viewpoints, the method comprising:
acquiring data of the plurality of viewpoint images;
a second acquisition process of acquiring the amount of change in a position of an imaging unit which has generated the data of the plurality of viewpoint images;
calculating a correction quantity of the shake correction and a mixture ratio used for generation of an image using the data of the plurality of viewpoint images using the amount of change acquired through the second acquisition process;
generating data of an image having a viewpoint different from the plurality of viewpoint images from the data of the plurality of viewpoint images using the mixture ratio; and
correcting shake of the viewpoint images or the image generated through the generation process according to the correction quantity.

20. A non-transitory computer readable storage medium storing a program causing a computer to execute an image processing method, the method comprising:
acquiring data of a plurality of viewpoint images;
acquiring the amount of change in a position of an imaging unit which has generated the data of the plurality of viewpoint images;
calculating a correction quantity of the shake correction and a mixture ratio used for generation of an image using the data of the plurality of viewpoint images using the amount of change acquired through the second acquisition process;

generating data of an image having a viewpoint different from the plurality of viewpoint images from the data of the plurality of viewpoint images using the mixture ratio; and correcting shake of the viewpoint images or the image generated through the generation process according to the correction quantity.

* * * * *